(12) United States Patent
Matsumoto

(10) Patent No.: US 11,684,889 B2
(45) Date of Patent: Jun. 27, 2023

(54) VEHICLE AIR PURIFICATION SYSTEM AND METHOD OF CONTROLLING VEHICLE AIR PURIFICATION SYSTEM

(71) Applicant: HONDA MOTOR CO., LTD., Tokyo (JP)

(72) Inventor: Subaru Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 208 days.

(21) Appl. No.: 17/151,804

(22) Filed: Jan. 19, 2021

(65) Prior Publication Data

US 2022/0226767 A1 Jul. 21, 2022

(51) Int. Cl.
*B01D 53/04* (2006.01)
*B60H 3/06* (2006.01)

(52) U.S. Cl.
CPC ..... *B01D 53/0454* (2013.01); *B01D 53/0438* (2013.01); *B01D 53/0446* (2013.01); *B60H 3/0658* (2013.01); *B01D 2257/504* (2013.01); *B01D 2257/80* (2013.01); *B01D 2259/4009* (2013.01); *B01D 2259/4566* (2013.01); *B60H 2003/0691* (2013.01)

(58) Field of Classification Search
CPC ................ B01D 53/04; B01D 53/0438; B01D 53/0446; B01D 53/0454; B01D 2257/80; B01D 2257/504; B01D 2258/06; B01D 2259/4009; B01D 2259/402; B01D 2259/4566; B60H 3/0658; B60H 2003/0691; Y02C 20/40
USPC .......... 96/111, 112, 115, 116, 121, 126–128; 95/8, 14, 26, 117, 123, 139
See application file for complete search history.

(56) References Cited

U.S. PATENT DOCUMENTS 5,556,028 A 9/1996 Khelifa
5,725,639 A * 3/1998 Khelifa .................. F24F 3/1411
96/144

(Continued)

FOREIGN PATENT DOCUMENTS

JP 08-224429 9/1996
JP 09-175163 7/1997

(Continued)

OTHER PUBLICATIONS

Machine-generated English translation of JP 9-175163, published Jul. 1997.*

(Continued)

*Primary Examiner* — Frank M Lawrence, Jr.
(74) *Attorney, Agent, or Firm* — Amin, Turocy & Watson, LLP

(57) ABSTRACT

A vehicle air purification system includes a first flow path which includes a first heating device (130-1), a first adsorption block (140-1), and a first flow path switching mechanism (150-1); and a second flow path that includes a second heating device (130-2), a second adsorption block (140-2), and a second flow path switching mechanism (150-2); and an air distribution mechanism (120) configured to distribute air flowing from the vehicle cabin to the first flow path and the second flow path; and a control device (20). The control device (20) controls components at a timing that can inhibit the flow of air from a flow path on the side where purification target substances to be purified are being desorbed into the vehicle cabin.

13 Claims, 9 Drawing Sheets

(56) References Cited

U.S. PATENT DOCUMENTS

| | | | |
|---|---|---|---|
| 5,938,523 A * | 8/1999 | Khelifa | F24F 8/10 |
| | | | 96/127 |
| 10,507,424 B1 * | 12/2019 | Muller-Hellwig | ............................ |
| | | | B01D 53/0462 |
| 2014/0338883 A1 * | 11/2014 | Watanabe | B60H 3/024 |
| | | | 165/59 |
| 2020/0171925 A1 * | 6/2020 | Matsumoto | B01D 53/0446 |
| 2020/0223293 A1 * | 7/2020 | Matsumoto | B60H 3/0035 |

FOREIGN PATENT DOCUMENTS

| | | |
|---|---|---|
| JP | 10-073286 | 3/1998 |
| JP | 2008-237954 | 10/2008 |
| JP | 2009-109115 | 5/2009 |
| JP | 2010-281476 | 12/2010 |
| JP | 2017-528316 | 9/2017 |
| JP | 2018-039514 | 3/2018 |
| WO | 2016/038340 | 3/2016 |

OTHER PUBLICATIONS

Japanese Notice of Allowance for Japanese Patent Application No. 2018-247037 dated Dec. 21, 2021.

Japanese Office Action for Japanese Patent Application No. 2018-247037 dated Oct. 5, 2021.

* cited by examiner

VEHICLE AIR PURIFICATION SYSTEM AND METHOD OF CONTROLLING VEHICLE AIR PURIFICATION SYSTEM

BACKGROUND

Field of the Invention

The present invention relates to a vehicle air purification system and a method of controlling the vehicle air purification system.

Description of Related Art

In an air conditioning system installed in a vehicle, an external air introduction mode in which a temperature of air suctioned from the outside of the vehicle is adjusted and delivered inside of a vehicle cabin and an internal air circulation mode in which a temperature is adjusted while the air within the vehicle cabin is circulated are set. When the vehicle is used during the winter period, it is necessary to raise a temperature of the external air suctioned using more energy because there is a large difference between the temperature of the external air and a set temperature of the vehicle cabin when a heating operation of warming the vehicle cabin is performed in the external air introduction mode. The problem of energy consumption becomes a bigger problem in an electric vehicle such as an electric automobile because it affects an available travel distance.

In recent years, a configuration in which a preset proportion of internal air is mixed with the suctioned external air even if an operation is performed in the external air introduction mode in air conditioning systems have been studied and put into practical use. In an air conditioning system with this configuration, it is possible to limit an amount of energy for use in adjustment of a temperature of air delivered to the vehicle cabin, i.e., power consumption of a battery, because the difference between the temperature of the external air and the set temperature within the vehicle cabin is reduced (mitigated) by the internal air which has a higher temperature than the external air.

Incidentally, air within the vehicle cabin (internal air) contains more carbon dioxide, water vapor, or the like physiologically emitted by breathing and metabolism of a driver or a passenger of the vehicle, i.e., a user who uses the vehicle, than air outside of the vehicle (external air). Thus, for example, when the vehicle is used during the winter period, the heating operation of warming the inside of the vehicle cabin in the internal air circulation mode may cause a windshield of the vehicle to be fogged up due to the water vapor contained in the air delivered inside of the vehicle cabin when the air conditioning system adjusts the temperature of the vehicle. Further, if an amount of carbon dioxide contained in the air delivered inside of the vehicle cabin by the air conditioning system is large, the large amount of carbon dioxide may affect a physical condition of the user of the vehicle.

In relation to the above, in Japanese Unexamined Patent Application, First Publication No. 2017-528316 (Patent Document 1), technology related to a system and a process for removing carbon dioxide of air of a passenger cabin (a vehicle cabin) of a vehicle, i.e., internal air, is disclosed. The system includes a carbon dioxide removal assembly that includes a regenerable carbon dioxide adsorbent material, a carbon dioxide removal conduit, and a regeneration conduit. The air (internal air) from the inside of the passenger cabin is allowed to flow over the regenerable carbon dioxide adsorbent material, the processed air is returned to the passenger cabin through the carbon dioxide removal conduit, the carbon dioxide is desorbed from the regenerable carbon dioxide adsorbent material by allowing desorption gas heated by a heater to flow over the regenerable carbon dioxide adsorbent material, and the desorbed carbon dioxide is expelled at a location outside the passenger cabin through the regeneration conduit.

SUMMARY

However, in the regenerable carbon dioxide adsorbent material as adopted in the technology disclosed in Patent Document 1, even if the state is switched from a state in which carbon dioxide is desorbed to a state in which carbon dioxide is adsorbed, the state in which carbon dioxide is desorbed continues for a while. This is because the regenerable carbon dioxide adsorbent material has a property of desorbing the adsorbed carbon dioxide when the temperature is higher than or equal to a predetermined temperature. Thus, in the technology described in Patent Document 1, even after the state in which carbon dioxide is desorbed ends according to control, the state in which the carbon dioxide adsorbent material may be kept at a predetermined temperature or higher continues and a desorbed purification target substance may be returned inside of the vehicle cabin.

An objective of the present invention is to provide a vehicle air purification system and a method of controlling the vehicle air purification system capable of limiting the flow of unpurified air through the inside of a vehicle cabin.

(1): According to an aspect of the present invention, there is provided a vehicle air purification system including: a first flow path configured to communicate with a vehicle cabin; a second flow path configured to communicate with the vehicle cabin; a blower configured to circulate air from the vehicle cabin toward the first flow path and the second flow path; an air distribution mechanism configured to distribute and deliver air flowing from the vehicle cabin to one end of the first flow path and one end of the second flow path; a $1\text{-}1^{st}$ flow path connected to the other end of the first flow path and configured to communicate with the vehicle cabin; a $1\text{-}2^{nd}$ flow path connected to the other end of the first flow path and configured to communicate with the outside of the vehicle cabin; a first heating device which is a heating device disposed in the first flow path and configured to heat air inside the first flow path; a first adsorption block which is an adsorption block disposed in the first flow path and configured to adsorb at least carbon dioxide and water vapor contained in the air inside the first flow path as purification target substances and desorb the purification target substances when the air heated by the first heating device is allowed to pass; a first flow path switching mechanism which is a flow path switching mechanism disposed in the first flow path and configured to predominantly allow air, which has passed through the first adsorption block, to flow through either the $1\text{-}1^{st}$ flow path or the $1\text{-}2^{nd}$ flow path; a $2\text{-}1^{st}$ flow path connected to the other end of the second flow path and configured to communicate with the vehicle cabin; a $2\text{-}2^{nd}$ flow path connected to the other end of the second flow path and configured to communicate with the outside of the vehicle cabin; a second heating device which is a heating device disposed in the second flow path and configured to heat air inside the second flow path; a second adsorption block which is an adsorption block disposed in the second flow path and configured to adsorb the purification target substances contained in the air inside the second flow path and desorb the purification target substances when the air heated by the second heating device is allowed to pass; a second flow path switching mechanism which is a flow path switching mechanism disposed in the second flow path and configured to predominantly allow air, which has passed through the second adsorption block, to flow through either the $2\text{-}1^{st}$ flow path or the $2\text{-}2^{nd}$ flow path; and a control device configured to alternately implement a first state in which the first flow path switching mechanism predominantly allows the air, which has passed through the first adsorption block, to flow through the $1\text{-}1^{st}$ flow path without operating the first heating device and the second flow path switching mechanism predominantly allows the air, which has passed through the second adsorption block, to flow through the $2\text{-}2^{nd}$ flow path by operating the second heating device and a second state in which the first flow path switching mechanism predominantly allows the air, which has passed through the first adsorption block, to flow through the $1\text{-}2^{nd}$ flow path by operating the first heating device and the second flow path switching mechanism predominantly allows the air, which has passed through the second adsorption block, to flow through the $2\text{-}1^{st}$ flow path without operating the second heating device, wherein the control device controls components at a timing when the flow of the air from a flow path of a side on which the purification target substances are being desorbed between the first flow path and the second flow path to the vehicle cabin is able to be limited when the state is switched between the first state and the second state.

(2): In the above-described aspect (1), when the state is switched from the first state to the second state, the control device causes the second heating device in operation to be stopped before the state is switched from a state in which the second flow path switching mechanism predominantly allows the air, which has passed through the second adsorption block, to flow through the $2\text{-}2^{nd}$ flow path to a state in which the second flow path switching mechanism predominantly allows the air, which has passed through the second adsorption block, to flow through the $2\text{-}1^{st}$ flow path, and, when the state is switched from the second state to the first state, the control device causes the first heating device in operation to be stopped before the state is switched from a state in which the first flow path switching mechanism predominantly allows the air, which has passed through the first adsorption block, to flow through the $1\text{-}2^{nd}$ flow path to a state in which the first flow path switching mechanism predominantly allows the air, which has passed through the first adsorption block, to flow through the $1\text{-}1^{st}$ flow path.

(3): In the above-described aspect (2), the control device performs time measurement with a timer from previous flow path switching by the first flow path switching mechanism and previous flow path switching by the second flow path switching mechanism and causes one of the heating devices to be stopped at a predetermined time.

(4): In the above-described aspect (2) or (3), the control device increases a proportion of the air to be distributed and delivered to the side on which the purification target substances are being desorbed by the air distribution mechanism in coordination with stopping of one of the heating devices as compared with a proportion of the air before the one of the heating devices is stopped.

(5): In the above-described aspects (1) to (4), when the state is switched from the first state to the second state, the control device causes switching from a state in which the second flow path switching mechanism predominantly allows the air, which has passed through the second adsorption block, to flow through the $2\text{-}2^{nd}$ flow path to a state in which the second flow path switching mechanism predominantly allows the air, which has passed through the second adsorption block, to flow through the $2\text{-}1^{st}$ flow path to be delayed, and, when the state is switched from the second state to the first state, the control device causes switching from a state in which the first flow path switching mechanism predominantly allows the air, which has passed through the first adsorption block, to flow through the $1\text{-}2^{nd}$ flow path to a state in which the first flow path switching mechanism predominantly allows the air, which has passed through the first adsorption block, to flow through the $1\text{-}1^{st}$ flow path to be delayed.

(6): In the above-described aspect (5), the control device performs time measurement with a timer from switching from the first state to the second state and switching from the second state to the first state and causes switching of a state in which the air is predominantly allowed to flow by one of the flow path switching mechanisms to be delayed until a predetermined time is reached.

(7): In the above-described aspects (5) or (6), the control device monitors a temperature of one of the adsorption blocks disposed in the flow path of the side on which the purification target substances are being desorbed, detected by a temperature sensor, from the switching from the first state to the second state and the switching from the second state to the first state and causes switching of a state in which the air is predominantly allowed to flow by one of the flow path switching mechanisms to be delayed until the monitored temperature is less than or equal to a preset threshold value of the temperature.

(8): In the above-described aspects (5) to (7), the control device monitors a temperature of the air that has predominantly flowed from the flow path of the side on which the purification target substances are being desorbed, detected by a temperature sensor, from the switching from the first state to the second state and the switching from the second state to the first state and causes switching of a state in which the air is predominantly allowed to flow by one of the flow path switching mechanisms to be delayed until the monitored temperature is less than or equal to a preset threshold value of the temperature.

(9): In the above-described aspects (5) to (8), the control device monitors a concentration of the purification target substances contained in the air that has predominantly flowed from the flow path of the side on which the purification target substances are being desorbed, detected by a concentration sensor, from the switching from the first state to the second state and the switching from the second state to the first state and causes switching of a state in which the air is predominantly allowed to flow by one of the flow path switching mechanisms to be delayed until the monitored concentration is less than or equal to a preset threshold value of the concentration.

(10): In the above-described aspects (5) to (9), in coordination with delaying of switching of a state in which the air is predominantly allowed to flow by one of the flow path switching mechanisms, when the state is switched from the first state to the second state, the control device causes switching from a state in which the first flow path switching mechanism predominantly allows the air, which has passed through the first adsorption block, to flow through the $1\text{-}1^{st}$ flow path to a state in which the first flow path switching mechanism predominantly allows the air, which has passed through the first adsorption block, to flow through the $1\text{-}2^{nd}$ flow path to be delayed, and when the state is switched from the second state to the first state, the control device causes switching from a state in which the second flow path switching mechanism predominantly allows the air, which has passed through the second adsorption block, to flow through the 2-1$^{st}$ flow path to a state in which the second flow path switching mechanism predominantly allows the air, which has passed through the second adsorption block, to flow through the 2-2$^{nd}$ flow path to be delayed.

(11): In the above-described aspects (5) to (10), while switching of a state in which the air is predominantly allowed to flow by one of the flow path switching mechanisms is delayed, the control device increases an amount of air to be circulated toward the first flow path and the second flow path by the blower as compared with an amount of air before the switching of the state in which the air is predominantly allowed to flow by one of the flow path switching mechanisms is delayed and increases a proportion of the air which is distributed and delivered to a flow path of the side on which the purification target substances are adsorbed by the air distribution mechanism as compared with a proportion of the air before the switching of the state in which the air is predominantly allowed to flow by one of the flow path switching mechanisms is delayed.

(12): In the above-described aspects (5) to (10), while switching of a state in which the air is predominantly allowed to flow by one of the flow path switching mechanisms is delayed, the control device decreases an amount of air to be circulated toward the first flow path and the second flow path by the blower as compared with an amount of air before the switching of the state in which the air is predominantly allowed to flow by the one of the flow path switching mechanisms is delayed and decreases a proportion of the air which is distributed and delivered to a flow path of the side on which the purification target substances are adsorbed by the air distribution mechanism as compared with a proportion of the air before the switching of the state in which the air is predominantly allowed to flow by the one of the flow path switching mechanisms is delayed.

(13) According to an aspect of the present invention, there is provided a method of controlling a vehicle air purification system, which includes a first flow path configured to communicate with a vehicle cabin, a second flow path configured to communicate with the vehicle cabin, a blower configured to circulate air from the vehicle cabin toward the first flow path and the second flow path, an air distribution mechanism configured to distribute and deliver air flowing from the vehicle cabin to one end of the first flow path and one end of the second flow path, a 1-1$^{st}$ flow path connected to the other end of the first flow path and configured to communicate with the vehicle cabin, a 1-2$^{nd}$ flow path connected to the other end of the first flow path and configured to communicate with the outside of the vehicle cabin, a first heating device which is a heating device disposed in the first flow path and configured to heat air inside the first flow path, a first adsorption block which is an adsorption block disposed in the first flow path and configured to adsorb at least carbon dioxide and water vapor contained in the air inside the first flow path as purification target substances and desorb the purification target substances when the air heated by the first heating device is passed, a first flow path switching mechanism which is a flow path switching mechanism disposed in the first flow path and configured to predominantly allow air, which has passed through the first adsorption block, to flow through either the 1-1$^{st}$ flow path or the 1-2$^{nd}$ flow path, a 2-1$^{st}$ flow path connected to the other end of the second flow path and configured to communicate with the vehicle cabin, a 2-2$^{nd}$ flow path connected to the other end of the second flow path and configured to communicate with the outside of the vehicle cabin, a second heating device which is a heating device disposed in the second flow path and configured to heat air inside the second flow path, a second adsorption block which is an adsorption block disposed in the second flow path and configured to adsorb the purification target substances contained in the air inside the second flow path and desorb the purification target substances when the air heated by the second heating device is passed, a second flow path switching mechanism which is a flow path switching mechanism disposed in the second flow path and configured to predominantly allow air, which has passed through the second adsorption block, to flow through either the 2-1$^{st}$ flow path or the 2-2$^{nd}$ flow path, and a control device configured to control components, the method including: alternately implementing, by the control device, a first state in which the first flow path switching mechanism predominantly allows the air, which has passed through the first adsorption block, to flow through the 1-1$^{st}$ flow path without operating the first heating device and the second flow path switching mechanism predominantly allows the air, which has passed through the second adsorption block, to flow through the 2-2$^{nd}$ flow path by operating the second heating device and a second state in which the first flow path switching mechanism predominantly allows the air, which has passed through the first adsorption block, to flow through the 1-2$^{nd}$ flow path by operating the first heating device and the second flow path switching mechanism predominantly allows the air, which has passed through the second adsorption block, to flow through the 2-1$^{st}$ flow path without operating the second heating device; and controlling, by the control device, the components at a timing when the flow of the air from a flow path of a side on which the purification target substances are being desorbed between the first flow path and the second flow path to the vehicle cabin is able to be limited when the state is switched between the first state and the second state.

According to configurations of the above-described aspects (1) to (13), because the components are controlled at the timing when the flow of the air from a flow path of a side on which the purification target substances are being desorbed between the first flow path and the second flow path to the vehicle cabin is able to be limited, it is possible to simultaneously implement an operation in which air purified by adsorbing the purification target substances in one of the adsorption blocks is returned to the vehicle cabin and an operation in which air from which the purification target substances have been desorbed in the other of the adsorption blocks is expelled outside the vehicle cabin and it is possible to limit the flow of unpurified air through the inside of the vehicle cabin.

DESCRIPTION OF EMBODIMENTS

Embodiments of the present invention will be described with reference to the drawings. In the following description, it is assumed that a vehicle air purification system of the present embodiment is installed in a four-wheeled electric vehicle such as an electric automobile that travels using an electric motor driven with electric power supplied from a battery (a cell).

(Overall Configuration)

Figure 1:
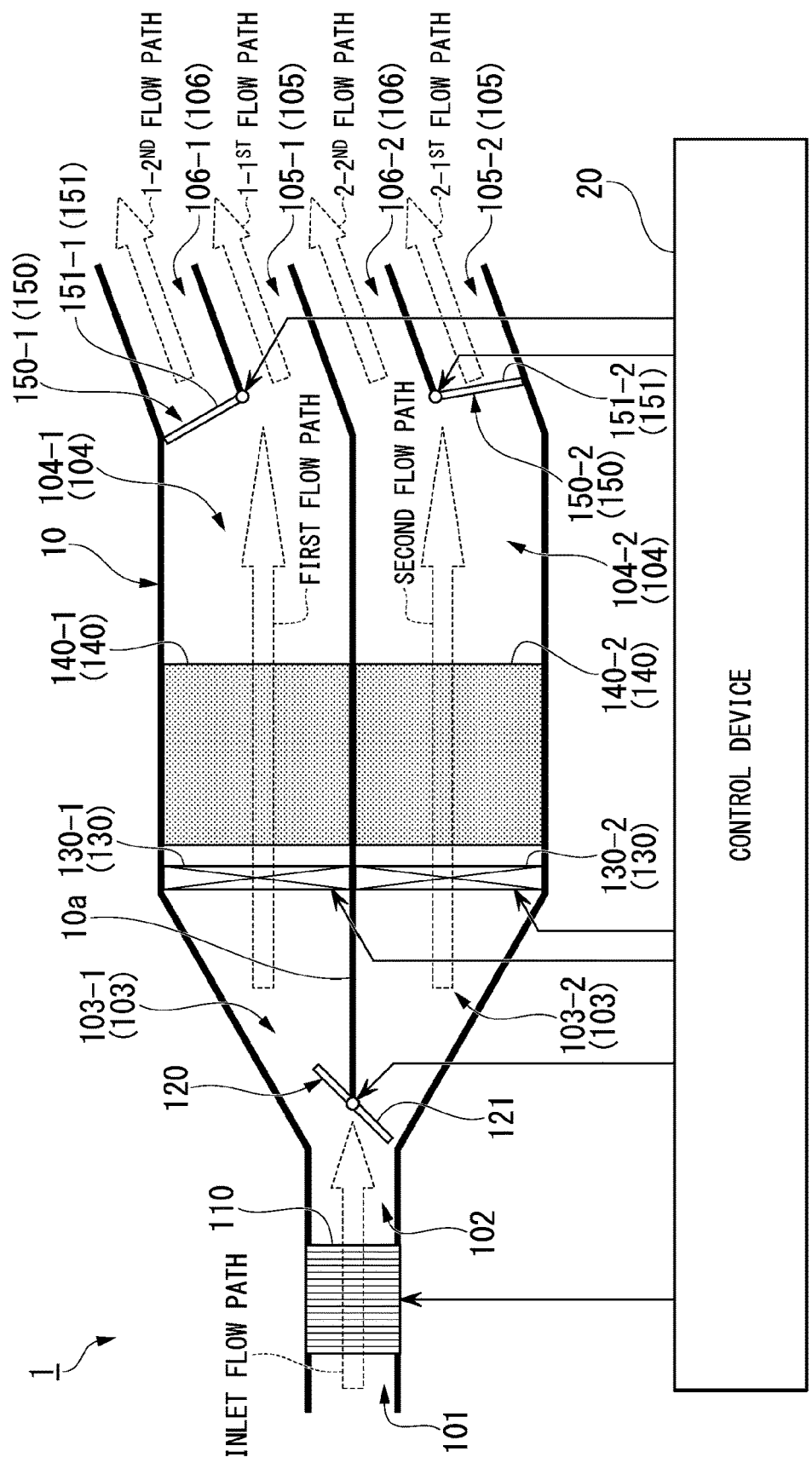
FIG. 1 is a block diagram showing a schematic configuration of a vehicle air purification system of the present embodiment.

FIG. 1 is a block diagram showing a schematic configuration of the vehicle air purification system of the present embodiment. The vehicle air purification system 1 shown in FIG. 1 includes a vehicle air purification device 10 and a control device 20.

The vehicle air purification device 10 is an air purification device that suctions and purifies air within a vehicle cabin of an electric vehicle (hereinafter referred to as "internal air"). The vehicle air purification device 10 has a function of removing purification target substances such as at least carbon dioxide and water vapor contained in the suctioned internal air. In the vehicle air purification device 10, a flow path through which the suctioned internal air passes is branched into two flow paths from a branch location, for example, by a partition wall 10a within a housing. In the following description, a flow path on a vehicle cabin side of the branch location is referred to as an "entrance flow path," one flow path branched by the partition wall 10a is referred to as a "first flow path," and the other flow path is referred to as a "second flow path."

The vehicle air purification device 10 suctions internal air inside the electric vehicle from an air inlet 101 connected to a duct on an upstream side communicating with the vehicle cabin of the electric vehicle. The vehicle air purification device 10 expels the internal air from which purification target substances have been removed by causing the suctioned internal air to pass through the first flow path or the second flow path, i.e., air purified by removing the purification target substances (hereinafter referred to as "purified air"), from a first air outlet 105 connected to the duct on the downstream side communicating with the vehicle cabin of the electric vehicle. Thereby, the purified air purified by the vehicle air purification device 10 is returned to the vehicle cabin of the electric vehicle. Also, the vehicle air purification device 10 expels air for expelling purification target substances removed when the suctioned internal air has been passed through the first flow path or the second flow path, i.e., air containing previously removed purification target substances (hereinafter referred to as "removed substance air"), from a second air outlet 106 connected to a duct on a downstream side communicating with the outside of the electric vehicle (the outside of the vehicle cabin). Thereby, the purification target substances previously removed from the internal air by the vehicle air purification device 10 are expelled outside of the electric vehicle. In the following description, a flow path for returning the purified air from the first flow path to the vehicle cabin of the electric vehicle is referred to as a "1-$1^{st}$ flow path" and a flow path for expelling the removed substance air outside of the electric vehicle is referred to as a "1-$2^{nd}$ flow path." Also, a flow path for returning purified air from the second flow path to the vehicle cabin of the electric vehicle is referred to as a "2-$1^{st}$ flow path" and a flow path for expelling the removed substance air outside of the electric vehicle is referred to as a "2-$2^{nd}$ flow path."

The vehicle air purification device 10 simultaneously performs an operation of returning the purified air to the vehicle cabin of the electric vehicle and an operation of expelling the removed substance air outside of the electric vehicle as basic purification operations. Thus, in the vehicle air purification device 10, the flow path for returning the purified air to the vehicle cabin of the electric vehicle is alternately switched between the 1-$1^{st}$ flow path and the 2-$1^{st}$ flow path by the control device 20. Also, in the vehicle air purification device 10, the flow path for expelling the removed substance air outside of the electric vehicle is alternately switched between the 1-$2^{nd}$ flow path and the 2-$2^{nd}$ flow path by the control device 20. More specifically, in the vehicle air purification device 10, the control device 20 alternately switches the state between a first state in which the purified air flows from the first flow path to the 1-$1^{st}$ flow path and the removed substance air flows from the second flow path to the 2-$2^{nd}$ flow path and a second state in which the removed substance air flows from the first flow path to the 1-$2^{nd}$ flow path and the purified air flows from the second flow path to the 2-$1^{st}$ flow path.

Also, in the vehicle air purification device 10 shown in FIG. 1, a set of the first air outlet 105 for allowing the purified air to flow and the second air outlet 106 for allowing the removed substance air to flow is provided in each of the first flow path and the second flow path. In the following description, the first air outlet 105 for allowing the purified air to flow from the first flow path to the 1-$1^{st}$ flow path is referred to as a "1-$1^{st}$ air outlet 105-1" and the second air outlet 106 for allowing the removed substance air to flow to the 1-$2^{nd}$ flow path is referred to as a "1-$2^{nd}$ air outlet 106-1." Also, the first air outlet 105 for allowing the purified air to flow from the second flow path to the 2-$1^{st}$ flow path is referred to as a "2-$1^{st}$ air outlet 105-2" and the second air outlet 106 for allowing the removed substance air to flow to the 2-$2^{nd}$ flow path is referred to as a 2-$2^{nd}$ air outlet 106-2."

Also, although a configuration in which a set of the first air outlet 105 and the second air outlet 106 is provided in each of the first flow path and the second flow path so that a structure of the first air outlet 105 and the second air outlet 106 is easily understood is shown in the vehicle air purification device 10 shown in FIG. 1, the structure of the first air outlet 105 and the second air outlet 106 in the vehicle air purification device 10 is not limited to the structure shown in FIG. 1. For example, in the vehicle air purification device 10, the first air outlet 105 corresponding to each of the first flow path and the second flow path may be configured as a common air outlet and the second air outlet 106 corresponding to each of the first flow path and the second flow path may be configured as a common air outlet.

The vehicle air purification device 10 is configured to include a blower 110, an air distribution mechanism 120, a pair of heating devices 130, a pair of adsorption blocks 140, and a pair of flow path switching mechanisms 150. In the vehicle air purification device 10, one of each of the pair of heating devices 130, the pair of adsorption blocks 140, and the pair of flow path switching mechanisms 150 is disposed on the first flow path side and the other is disposed on the second flow path side. In the following description, the heating device 130 disposed on the first flow path side is referred to as a "first heating device 130-1," the adsorption block 140 disposed on the first flow path side is referred to as a "first adsorption block 140-1," and the flow path switching mechanism 150 disposed on the first flow path side is referred to as a "first flow path switching mechanism 150-1." Also, the heating device 130 disposed on the second flow path side is referred to as a "second heating device 130-2," the adsorption block 140 disposed on the second flow path side is referred to as a "second adsorption block 140-2," and the flow path switching mechanism 150 disposed on the second flow path side is referred to as a "second flow path switching mechanism 150-2."

The blower 110 is a fan for suctioning and circulating the internal air within the vehicle cabin of the electric vehicle from the air inlet 101 connected to the duct on the upstream side in accordance with control from the control device 20. The blower 110 allows the internal air suctioned from the air inlet 101 to flow through the entrance flow path and delivers the internal air to the air chamber 102.

The air distribution mechanism 120 is a mechanism that distributes the internal air delivered to the air chamber 102 by the blower 110 to the first flow path and the second flow path in accordance with the control from the control device 20. The air distribution mechanism 120 is configured to include an opening/closing door 121 that rotates to distribute the internal air to the first flow path and the second flow path and a control function (not shown) (for example, an actuator or the like) that controls a direction in which the opening/closing door 121 rotates and a rotation amount in accordance with the control from the control device 20. The internal air within the air chamber 102 distributed by the air distribution mechanism 120 is delivered to each of the first flow path from the first air chamber 103-1 side to the first air chamber 104-1 side and the second flow path from the second air chamber 103-2 side to the second air chamber 104-2 side. Also, when each of the first air chamber 103-1 constituting the first flow path and the second air chamber 103-2 constituting the second flow path is represented without distinction in the following description, the first air chamber 103-1 or the second air chamber 103-2 is simply referred to as an "air chamber 103" without the hyphen "-" and the number subsequent to the hyphen "-" included in the reference sign for denoting the first flow path or the second flow path. Likewise, when each of the first air chamber 104-1 constituting the first flow path and the second air chamber 104-2 constituting the second flow path is represented without distinction, the first air chamber 104-1 or the second air chamber 104-2 is simply referred to as an "air chamber 104."

The heating device 130 is a heater that heats the air inside the flow path distributed by the air distribution mechanism 120 in accordance with the control from the control device 20. When the internal air delivered to the disposed flow path is allowed to pass, the heating device 130 heats the internal air which is allowed to pass in accordance with the control from the control device 20. The first heating device 130-1 disposed in the first flow path causes the internal air delivered to the first flow path to pass in the direction of the first adsorption block 140-1 in a heated state or as it is in an unheated state. Also, the second heating device 130-2 disposed in the second flow path causes the internal air delivered to the second flow path to pass in the direction of the second adsorption block 140-2 in a heated state or as it is in an unheated state.

The adsorption block 140 is an adsorbent material on which an adsorbent layer for adsorbing purification target substances contained in the internal air or desorbing the adsorbed purification target substances is disposed when the internal air flowing through the flow path disposed to pass through the corresponding heating device 130 is allowed to pass. The adsorption block 140 adsorbs the purification target substances contained in the internal air and delivers the adsorbed purification target substances to the corresponding air chamber 104 when the internal air, which has passed through the corresponding heating device 130 as it is in an unheated state, is allowed to pass. More specifically, the first adsorption block 140-1 disposed in the first flow path delivers the purified air obtained by adsorbing the purification target substances contained in the internal air, which has flowed through the first flow path without being heated by the first heating device 130-1, to the first air chamber 104-1. Also, the second adsorption block 140-2 disposed in the second flow path delivers the purified air obtained by adsorbing the purification target substances contained in the internal air, which has flowed through the second flow path without being heated by the second heating device 130-2, to the second air chamber 104-2.

Also, the adsorption block 140 is regenerated into a state in which the purification target substances are not adsorbed by desorbing the previously adsorbed purification target substances when the internal air is heated by the corresponding heating device 130 and the heated internal air is allowed to pass. Thereby, the heated internal air used for the regeneration of the adsorption block 140, i.e., the removed substance air containing the purification target substances once adsorbed, is delivered to the corresponding air chamber 104. More specifically, the first adsorption block 140-1 disposed in the first flow path delivers the removed substance air used for regeneration according to heating by the first heating device 130-1 to the first air chamber 104-1. Also, the second adsorption block 140-2 disposed in the second flow path delivers the removed substance air used for regeneration according to heating by the second heating device 130-2 to the second air chamber 104-2.

Also, the purification target substances to be adsorbed or desorbed by the adsorption block 140 contain at least carbon dioxide and water vapor. Thus, for example, zeolite and the like capable of adsorbing carbon dioxide, water vapor, volatile organic compounds (VOC), and the like can be considered as the adsorbent material of the adsorbent layer disposed in the adsorption block 140. Here, as the structure of the adsorbent layer disposed on the adsorption block 140, for example, a structure in which an adsorbent material such as zeolite is supported or impregnated on the base material of the adsorption block 140 or the like can be considered. However, in the present invention, the structure of the adsorbent layer in the adsorption block 140 is not particularly specified.

The flow path switching mechanism 150 is a mechanism for switching the air outlet through which the air delivered to the air chamber 104 of the disposed flow path predominantly flows to either the first air outlet 105 or the second air outlet 106 in accordance with the control from the control device 20. The flow path switching mechanism 150 is configured to include an opening/closing door 151 that rotates to switch the air outlet and a control function (for example, an actuator or the like) (not shown) for controlling a direction in which the opening/closing door 151 rotates in accordance with the control from the control device 20. The air within the air chamber 104 is expelled from either the first air outlet 105 or the second air outlet 106 that is in the open state.

More specifically, when the 1-$1^{st}$ air outlet 105-1 is in an open state and the 1-$2^{nd}$ air outlet 106-1 is in a closed state by the first opening/closing door 151-1 constituting the first flow path switching mechanism 150-1 disposed in the first flow path, the purified air within the first air chamber 104-1 is expelled from the 1-$1^{st}$ air outlet 105-1, predominantly allowed to flow through the 1-1$^{st}$ flow path, and returned to the vehicle cabin of the electric vehicle through a duct on the downstream side connected to the 1-1$^{st}$ air outlet 105-1. On the other hand, when the 1-1$^{st}$ air outlet 105-1 is in the closed state and the 1-2$^{nd}$ air outlet 106-1 is in the open state by the first opening/closing door 151-1 constituting the first flow path switching mechanism 150-1, the air within the first air chamber 104-1 is expelled from the 1-2$^{nd}$ air outlet 106-1, predominantly allowed to flow through the 1-2$^{nd}$ flow path, and expelled outside of the electric vehicle through a duct on the downstream side connected to the 1-2$^{nd}$ air outlet 106-1. Also, when the 2-1$^{st}$ air outlet 105-2 is in an open state and the 2-2$^{nd}$ air outlet 106-2 is in a closed state by the second opening/closing door 151-2 constituting the second flow path switching mechanism 150-2 disposed in the second flow path, the purified air within the second air chamber 104-2 is expelled from the 2-1$^{st}$ air outlet 105-2, predominantly allowed to flow through the 2-1$^{st}$ flow path, and returned to the vehicle cabin of the electric vehicle through a duct on the downstream side connected to the 2-1$^{st}$ air outlet 105-2. On the other hand, when the 2-1$^{st}$ air outlet 105-2 is in the closed state and the 2-2$^{nd}$ air outlet 106-2 is in the open state by the second opening/closing door 151-2 constituting the second flow path switching mechanism 150-2, the air within the second air chamber 104-2 is expelled from the 2-2$^{nd}$ air outlet 106-2, predominantly allowed to flow through the 2-2$^{nd}$ flow path, and expelled outside of the electric vehicle through a duct on the downstream side connected to the 2-2$^{nd}$ air outlet 106-2.

The control device 20 includes, for example, a processor such as a central processing unit (CPU) and a storage device (a storage device including a non-transient storage medium) storing a program, and various functions are executed by the processor executing the program. Also, the control device 20 may be implemented by hardware (a circuit unit including circuitry) such as a large-scale integration (LSI) circuit, an application specific integrated circuit (ASIC), a field-programmable gate array (FPGA), or a graphics processing unit (GPU) or may be implemented by software and hardware in cooperation.

Also, the control device 20 is not limited to a single component provided in the vehicle air purification system 1. For example, the function of controlling each component provided in the vehicle air purification device 10 in the control device 20 as described above may be a function that is implemented by an electronic control unit (ECU) that electrically controls the entire electric vehicle. That is, the ECU provided in the electric vehicle may be the control device 20 in the vehicle air purification system 1.

The control device 20 controls operations of the blower 110, the air distribution mechanism 120, the heating device 130, and the flow path switching mechanism 150 provided in the vehicle air purification device 10. The control device 20 outputs a control signal for controlling the operations of the blower 110, the air distribution mechanism 120, the heating device 130, and the flow path switching mechanism 150 to each component.

More specifically, the control device 20 outputs a control signal for controlling a rotational speed of the fan when the blower 110 suctions air from the air inlet 101 to the blower 110. Thereby, the blower 110 rotates the fan at the rotational speed represented by the control signal output from the control device 20 and allows the internal air suctioned from the air inlet 101 to flow through the entrance flow path at a volume of airflow according to the rotational speed of the fan.

Also, the control device 20 outputs a control signal for controlling a rotation direction and a rotation amount of the opening/closing door 121 constituting the air distribution mechanism 120 to a control function (not shown) constituting the air distribution mechanism 120 in accordance with a ratio between the first flow path and the second flow path to which the air distribution mechanism 120 distributes the internal air delivered to the air chamber 102. Thereby, according to the control function (not shown), the air distribution mechanism 120 causes the opening/closing door 121 to rotate in the rotation direction and the rotation amount represented by the control signal output from the control device 20 and distributes the internal air allowed to flow through the entrance flow path to the first flow path and the second flow path at the ratio controlled from the control device 20.

Also, the control device 20 outputs a control signal for controlling the operation (on) and stopping (off) of the heating device 130 to each heating device 130. Thereby, the heating device 130 controlled in the on state by the control device 20 heats the internal air flowing through the disposed flow path and causes the internal air to pass in the direction of the corresponding adsorption block 140. Also, the heating device 130 controlled in the off state by the control device 20 causes the internal air flowing through the disposed flow path to pass in the direction of the corresponding adsorption block 140 as it is in an unheated state.

Also, the control device 20 outputs a control signal for controlling the rotation direction of the opening/closing door 151 constituting the flow path switching mechanism 150 to the control function (not shown) when the flow path is switched between a flow path for returning the air, which has passed through the adsorption block 140, to the vehicle cabin of the electric vehicle and a flow path for expelling the air outside of the electric vehicle. More specifically, the control device 20 controls the rotation direction of the opening/closing door 151 of the flow path for returning the air, which has passed through the adsorption block 140, to the vehicle cabin of the electric vehicle to control the first air outlet 105 in the open state and the second air outlet 106 in the closed state and controls the rotation direction of the opening/closing door 151 of the flow path for expelling the removed substance air, which has passed through the adsorption block 140, outside of the electric vehicle to control the first air outlet 105 in the closed state and the second air outlet 106 in the open state. Thereby, the flow path switching mechanism 150 causes the opening/closing door 151 to rotate in the rotation direction represented by the control signal output from the control device 20 and switches the air outlet for expelling the purified air delivered to the corresponding air chamber 104 to either the first air outlet 105 or the second air outlet 106 according to the control function (not shown).

Also, as described above, in the vehicle air purification system 1, the operation of returning the purified air from the vehicle air purification device 10 to the vehicle cabin of the electric vehicle and the operation of expelling the removed substance air outside of the electric vehicle are simultaneously performed. Thus, the control device 20 controls the rotation direction of the opening/closing door 151 constituting each flow path switching mechanism 150 so that an air outlet for predominantly allowing air to flow through the first flow path and an air outlet for predominantly allowing air to flow through the second flow path are reversed as basic control on the flow path switching mechanism 150.

Thus, the control device 20 controls operations of the blower 110, the air distribution mechanism 120, the heating device 130, and the flow path switching mechanism 150 provided in the vehicle air purification device 10, so that the flow path is switched between the flow path for returning the purified air from which the purification target substances have been adsorbed by each adsorption block 140 provided in the vehicle air purification device 10 to the vehicle cabin of the electric vehicle and the flow path for expelling the removed substance air used in the desorption of the purification target substances adsorbed by the adsorption block 140 outside of the electric vehicle. In other words, the control device 20 switches the flow path between a flow path for adsorbing purification target substances (carbon dioxide and water vapor) contained in the internal air within the vehicle cabin of the electric vehicle using the adsorption block 140 and a flow path for desorbing the previously adsorbed purification target substance. At this time, the control device 20 uses one of the first flow path and the second flow path as the flow path for returning purified air to the vehicle cabin of the electric vehicle and uses the other flow path as the flow path for expelling the removed substance air outside of the electric vehicle. Thereby, in the vehicle air purification device 10 of the vehicle air purification system 1, while one of the adsorption blocks 140 adsorbs the purification target substances, the other adsorption block 140 is regenerated by desorbing the purification target substances. That is, in the vehicle air purification system 1, the operation of returning the purified air in the vehicle air purification device 10 to the vehicle cabin of the electric vehicle and the operation of expelling the removed substance air outside of the electric vehicle are simultaneously performed. The control device 20 iterates switching between the flow path for returning the purified air to the vehicle cabin of the electric vehicle and the flow path for expelling the removed substance air outside of the electric vehicle at each predetermined timing when the flow of air from the flow path of the side from which the purification target substances are being desorbed between the first flow path and the second flow path to the vehicle cabin can be limited, for example, at intervals of 2 to 5 minutes and the like. Thereby, in the vehicle air purification system 1, the delivery of the purified air to the vehicle cabin by the vehicle air purification device 10 and the delivery (expelling) of the removed substance air outside of the vehicle are continuously performed.

Also, the timing when the control device 20 switches the flow path is determined on the basis of purification performance of each adsorption block 140 provided in the vehicle air purification device 10. At this time, a timing when the control device 20 switches the flow path may be determined on the basis of a time period in which the adsorption block 140 can continue to adsorb the purification target substances, a capacity in which the adsorption block 140 can adsorb the purification target substances, or the like varying with a capacity of an adsorbent material contained in the adsorbent layer disposed in the adsorption block 140 or the like. Thereby, in the vehicle air purification system 1, the timing when the control device 20 switches the flow path can be set at an optimum time interval according to the purification performance of the adsorption block 140. In the vehicle air purification system 1, for example, the flow path can be easily switched at the same time interval by measuring the time determined from the timing when the control device 20 has switched the flow path using a timer or the like.

Figure 2:
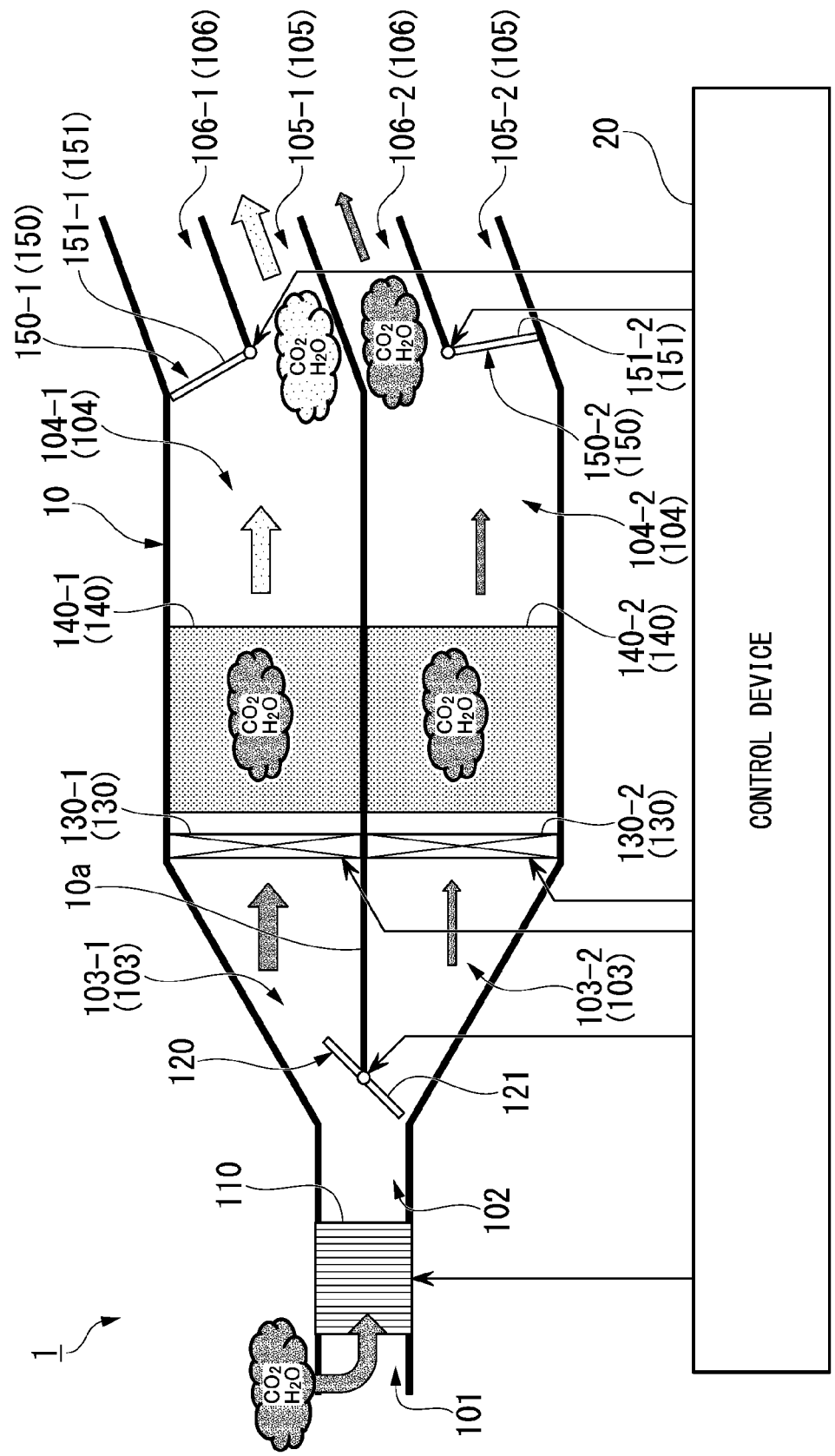
FIG. 2 is a diagram schematically showing an example of a state of air purification.

Here, the operation of removing carbon dioxide or water vapor in the vehicle air purification system 1 will be described. FIG. 2 is a diagram schematically showing an example of a state of air purification in the vehicle air purification system 1. In FIG. 2, a state in which purified air from which carbon dioxide or water vapor has been removed along the first flow path is returned to the vehicle cabin of the electric vehicle and carbon dioxide or water vapor previously removed along the second flow path is desorbed and expelled outside of the electric vehicle is schematically shown.

In this case, the control device 20 causes the blower 110 to flow the internal air containing carbon dioxide or water vapor suctioned from the air inlet 101 through the entrance flow path at a predetermined volume of airflow and deliver the internal air to the air chamber 102. The control device 20 causes the air distribution mechanism 120 to distribute the internal air flowing through the entrance flow path to the first flow path and the second flow path. At this time, the control device 20 sets a ratio between a volume of airflow of internal air flowing through the first flow path and a volume of airflow of internal air flowing through the second flow path to, for example, first flow path:second flow path=3:1. Thereby, 75% of the internal air that is allowed to flow through the entrance flow path and delivered to the air chamber 102 by the blower 110 is delivered to the first air chamber 103-1 and the remaining 25% is delivered to the second air chamber 103-2.

The control device 20 turns off the first heating device 130-1 disposed in the first flow path. Also, the control device 20 causes the first flow path switching mechanism 150-1 to set the 1-$1^{st}$ air outlet 105-1 in the open state and set the 1-$2^{nd}$ air outlet 106-1 in the closed state. Thereby, the internal air delivered to the first air chamber 103-1 passes in the direction of the first adsorption block 140-1 as it is without being heated by the first heating device 130-1 and the purified air from which carbon dioxide and water vapor have been adsorbed by the first adsorption block 140-1 is delivered to the first air chamber 104-1. In FIG. 2, a state in which purified air from which carbon dioxide and water vapor have been adsorbed by the first adsorption block 140-1 is delivered from the 1-$1^{st}$ air outlet 105-1 is schematically shown. Here, the purified air delivered from the 1-$1^{st}$ air outlet 105-1 flows through the 1-$1^{st}$ flow path and is returned to the vehicle cabin of the electric vehicle.

On the other hand, the control device 20 turns on the second heating device 130-2 disposed in the second flow path. Also, the control device 20 causes the second flow path switching mechanism 150-2 to set the 2-$1^{st}$ air outlet 105-2 in the closed state and set the 2-$2^{nd}$ air outlet 106-2 in the open state. Thereby, the internal air delivered to the second air chamber 103-2 is heated by the second heating device 130-2 and passes in the direction of the second adsorption block 140-2 and the second adsorption block 140-2 is regenerated by desorbing previously adsorbed carbon dioxide and water vapor. The removed substance air from which the second adsorption block 140-2 has desorbed carbon dioxide and water vapor is delivered to the second air chamber 104-2 and is expelled from the 2-$2^{nd}$ air outlet 106-2 outside of the electric vehicle. In FIG. 2, a state in which the removed substance air from which carbon dioxide and water vapor adsorbed on the second adsorption block 140-2 have been desorbed is delivered from the 2-$2^{nd}$ air outlet 106-2 is schematically shown. Here, the removed substance air delivered from the 2-$2^{nd}$ air outlet 106-2 flows through the 2-$2^{nd}$ flow path and is expelled outside of the electric vehicle (outside of the vehicle cabin).

As described above, in the vehicle air purification system 1, the control device 20 causes an operation of returning the purified air to the vehicle cabin of the electric vehicle along the first flow path and an operation of expelling the removed substance air outside of the electric vehicle along the second flow path to be performed in parallel at the same time. Subsequently, the control device 20 switches the flow path so that the purified air is returned to the vehicle cabin of the electric vehicle along the second flow path at a predetermined timing (for example, at a timing when a predetermined time period such as 5 minutes has elapsed) and the removed substance air is expelled outside of the electric vehicle along the first flow path. Also, a control process of the control device 20 at this time can be easily considered only by reversing the control of each component performed to obtain the state shown in FIG. 2 and therefore detailed description thereof will be omitted.

Subsequently, the control device 20 periodically iterates switching between the first flow path and the second flow path at each predetermined timing. Thereby, in the vehicle air purification system 1, the vehicle air purification device 10 can continuously perform the delivery of the purified air to the vehicle cabin and the delivery (expelling) of the removed substance air outside of the vehicle.

Next, a detailed method in which the control device 20 controls each component provided in the vehicle air purification device 10 will be described. First, an operation in which the flow path is simply periodically switched between the flow path for returning the purified air from which carbon dioxide or water vapor has been removed to the vehicle cabin of the electric vehicle and the flow path for desorbing the previously removed carbon dioxide or water vapor and expelling the desorbed carbon dioxide or water vapor outside of the electric vehicle will be described as a comparative example so that the control of the vehicle air purification device 10 by the control device 20 is understood. Also, in the following description, for ease of description, a case in which water vapor is removed from the internal air by the vehicle air purification device 10 will be described.

Figure 3:
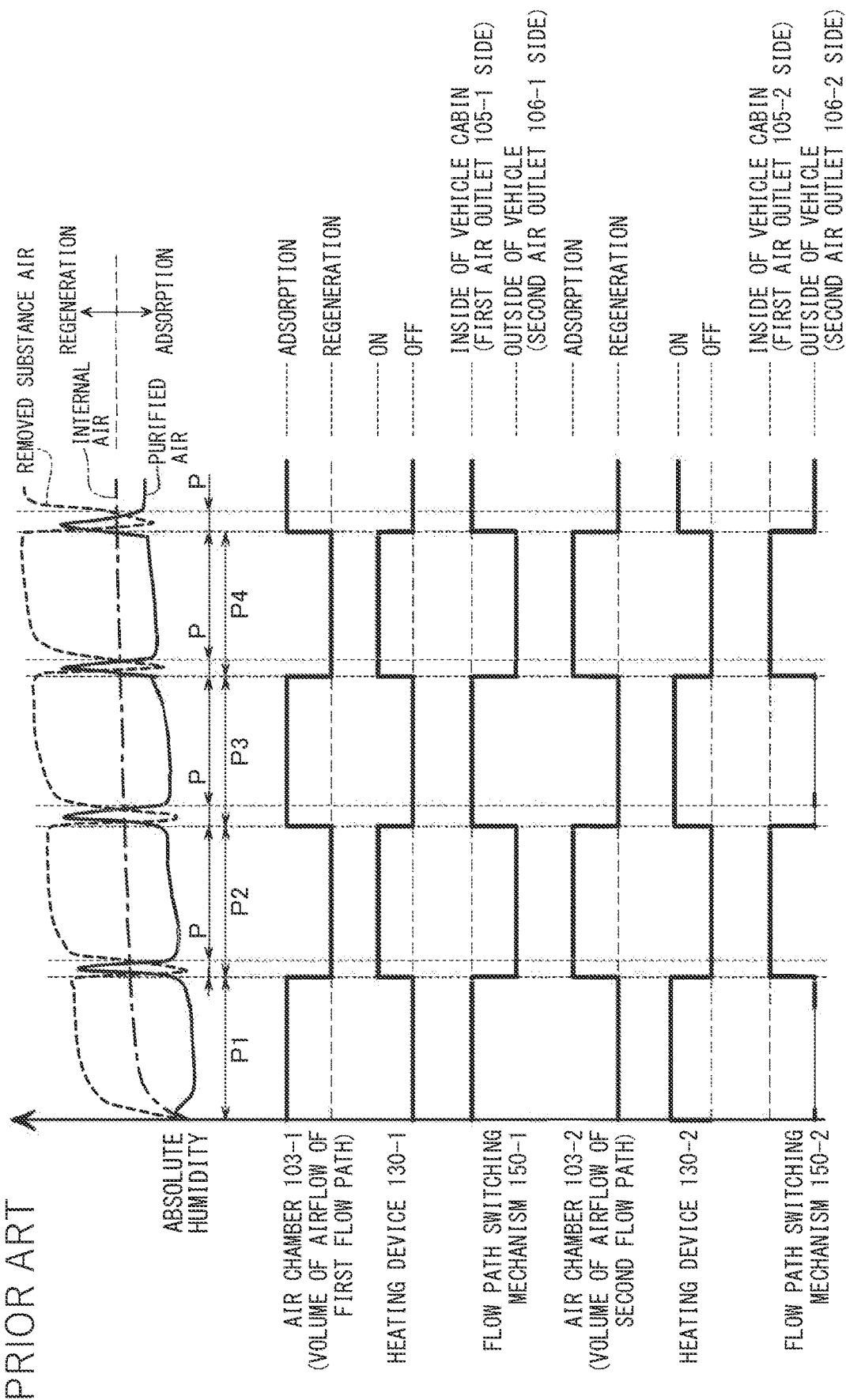
FIG. 3 is a diagram showing an operation in the vehicle air purification system of a comparative example.

FIG. 3 is a diagram showing an operation in a vehicle air purification system of a comparative example. In FIG. 3, a case in which the control device 20 controls the operation of each component provided in the vehicle air purification device 10 as in the vehicle air purification system of the comparative example in which the flow path is simply switched is shown. Also, in FIG. 3, changes in states of components provided in the vehicle air purification device 10 during a purification period for four cycles in which the flow path is switched according to the control of the control device 20 are shown. More specifically, a volume of airflow of the internal air flowing through the first air chamber 103-1, i.e., flowing through the first flow path, and a volume of airflow of the internal air flowing through the second air chamber 103-2, i.e., flowing through the second flow path, are shown in FIG. 3. Also, the on and off states of the first heating device 130-1 and the second heating device 130-2 are shown in FIG. 3. Also, a state in which each of the first flow path switching mechanism 150-1 and the second flow path switching mechanism 150-2 switches the air outlet for expelling the air delivered to the corresponding air chamber 104 is shown in FIG. 3.

Also, an example of a change in an amount of water vapor contained in the air in each of the internal air suctioned by the vehicle air purification device 10 from the air inlet 101, the purified air expelled from the first air outlet 105, and the removed substance air expelled from the second air outlet 106 is shown as a change in absolute humidity in FIG. 3. Also, as for the change in the absolute humidity shown in FIG. 3, the state is a state in which the adsorption block 140 is adsorbing the water vapor contained in the internal air when the absolute humidity is lower than the absolute humidity of the internal air and is a state in which the water vapor adsorbed by the adsorption block 140 is being desorbed, i.e., the adsorption block 140 is being regenerated, when the absolute humidity is higher than or equal to the absolute humidity of the internal air.

First, in a purification period P1, the control device 20 controls each component provided in the vehicle air purification device 10 so that the first flow path is set in the first state in which the purified air from which water vapor has been removed is returned to the vehicle cabin of the electric vehicle and the second flow path is set in the second state in which the removed substance air after the regeneration of the second adsorption block 140-2 is expelled outside of the electric vehicle.

More specifically, the control device 20 controls the blower 110, so that a preset given amount of internal air is suctioned from the air inlet 101 and delivered to the air chamber 102. The control device 20 controls the air distribution mechanism 120, so that the internal air delivered to the air chamber 102 is distributed. Also, as described above, the control device 20 increases a volume of airflow of internal air flowing through the flow path for returning the purified air from which water vapor has been removed to the vehicle cabin of the electric vehicle, i.e., the flow path for adsorbing the water vapor using the adsorption block 140, and increases a volume of airflow of internal air flowing through the flow path for desorbing the adsorbed water vapor and expelling the desorbed water vapor outside of the electric vehicle, i.e., the flow path for regenerating the adsorption block 140. Thus, in the purification period P1, the control device 20 increases a volume of airflow of the first flow path for causing the first adsorption block 140-1 to adsorb water vapor and decreases a volume of airflow of the second flow path for causing the second adsorption block 140-2 to be regenerated. Also, the control device 20 turns off the first heating device 130-1 disposed in the first flow path for causing the first adsorption block 140-1 to adsorb water vapor and turns on the second heating device 130-2 disposed in the second flow path for causing the second adsorption block 140-2 to be regenerated. Also, the control device 20 controls the first flow path switching mechanism 150-1, so that the air outlet for predominantly allowing the purified air to flow through the first flow path is switched to the 1-1$^{st}$ air outlet 105-1, and controls the second flow path switching mechanism 150-2, so that the air outlet for predominantly allowing the removed substance air to flow through the second flow path is switched to the 2-2$^{nd}$ air outlet 106-2.

Thereby, in the purification period P1, as indicated by the change in the absolute humidity, the purified air from which water vapor has been removed by the first adsorption block 140-1 is returned from the first flow path to the vehicle cabin of the electric vehicle and the removed substance air after the regeneration of the second adsorption block 140-2 is expelled from the second flow path outside of the electric vehicle.

Subsequently, the control device 20 switches the first flow path and the second flow path in a purification period P2 to states opposite to those of the purification period P1. That is, the control device 20 controls each component provided in the vehicle air purification device 10 so that the first flow path is set in the second state in which the removed substance air after the regeneration of the first adsorption block 140-1 is expelled outside of the electric vehicle and the second flow path is set in the first state in which the purified air from which water vapor has been removed is returned to the vehicle cabin of the electric vehicle.

More specifically, in the purification period P2, the control device 20 also causes the blower 110 to suction a preset given amount of internal air from the air inlet 101 and deliver the suctioned internal air to the air chamber 102. In the purification period P2, the control device 20 decreases a volume of airflow of the first flow path for causing the first adsorption block 140-1 to be regenerated and increases a volume of airflow of the second flow path for causing the second adsorption block 140-2 to adsorb water vapor. Also, the control device 20 turns on the first heating device 130-1 disposed in the first flow path for causing the first adsorption block 140-1 to be regenerated and turns off the second heating device 130-2 disposed in the second flow path for causing the second adsorption block 140-2 to adsorb water vapor. Also, the control device 20 controls the first flow path switching mechanism 150-1, so that the air outlet for predominantly allowing the removed substance air to flow through the first flow path is switched to the 1-$2^{nd}$ air outlet 106-1, and controls the second flow path switching mechanism 150-2, so that the air outlet for predominantly allowing the purified air to flow through the second flow path is switched to the 2-$1^{st}$ air outlet 105-2.

Thereby, in the purification period P2, as indicated by the change in the absolute humidity, the purified air from which water vapor has been removed by the second adsorption block 140-2 is returned from the second flow path to the vehicle cabin of the electric vehicle and the removed substance air after the regeneration of the first adsorption block 140-1 is expelled from the first flow path outside of the electric vehicle.

Subsequently, likewise, the control device 20 iterates control for switching the first flow path and the second flow path to opposite states in each purification period P.

As described above, in the vehicle air purification system of the comparative example, the control device 20 reverses the states of the first flow path and the second flow path in each purification period P, so that the first adsorption block 140-1 and the second adsorption block 140-2 are allowed to alternately remove water vapor contained in the internal air and the first adsorption block 140-1 and the second adsorption block 140-2 are regenerated by causing the water vapor adsorbed by the first adsorption block 140-1 and the second adsorption block 140-2 to be alternately desorbed.

Here, in the vehicle air purification system of the comparative example, because the flow path is simply switched, the absolute humidity of the purified air has become higher than the absolute humidity of the internal air for a while (during a period P shown in FIG. 3) after the control device 20 switches the flow path as can be seen from the change in the absolute humidity shown in FIG. 3. This is because the internal air flowing through the flow path for removing water vapor is heated by the residual heat from the heating device 130 previously turned on to regenerate the adsorption block 140 and the adsorption block 140 is in a state in which the previously adsorbed water vapor is desorbed. That is, the adsorption block 140 is continuously in a regenerated state by desorbing the adsorbed water vapor until the internal air to be passed cools to a temperature at which the water vapor is adsorbed. In this case, the water vapor desorbed in the period P is returned to the vehicle cabin of the electric vehicle along the flow path switched by the control device 20. Then, the purified air containing the desorbed water vapor can cause the windshield of the vehicle to be fogged up.

Therefore, in the vehicle air purification system 1, the control device 20 adopts one or more of the control methods to be described below in consideration of a situation of the purified air when the flow path is switched as described above and controls each component provided in the vehicle air purification device 10. FIGS. 4 to 9 are diagrams showing control methods in the vehicle air purification system.

In each of the control methods to be described below, the control device 20 also periodically switches the flow path between the flow path for returning the purified air from which carbon dioxide or water vapor has been removed to the vehicle cabin of the electric vehicle and the flow path for desorbing the previously removed carbon dioxide or water vapor and expelling air containing the previously removed carbon dioxide or water vapor outside of the electric vehicle. Thereby, in each of the control methods to be described below, the purified air from which carbon dioxide or water vapor has been removed is returned to the vehicle cabin of the electric vehicle and the removed substance air after the regeneration of the adsorption block 140 is expelled outside of the electric vehicle as in the comparative example. In the following description, for ease of description, a case in which water vapor is removed from the internal air by the vehicle air purification device 10 will be described as in the comparative example.

In FIGS. 4 to 9, as in FIG. 3, changes in the states of the components provided in the vehicle air purification device 10 during a purification period for four cycles in which the flow path is switched according to the control of the control device 20 are shown. More specifically, in FIGS. 4 to 9, the volume of airflow of the internal air flowing through the first air chamber 103-1 (the first flow path), the volume of airflow of the internal air flowing through the second air chamber 103-2 (the second flow path), the on and off states of the first heating device 130-1 and the second heating device 130-2, and the state in which the air outlet for expelling the air delivered to the air chamber 104 corresponding to each of the first flow path switching mechanism 150-1 and the second flow path switching mechanism 150-2 is switched are also shown.

Also, in FIGS. 4 to 9, as in FIG. 3, an example of changes in amounts of water vapor contained in the internal air suctioned by the vehicle air purification device 10 from the air inlet 101, the purified air expelled from the first air outlet 105, and the removed substance air expelled from the second air outlet 106 is shown as a change in absolute humidity. Also, as for the change in absolute humidity shown in FIGS. 4 to 9, as in FIG. 3, the state is a state in which the adsorption block 140 is adsorbing the water vapor contained in the internal air when the absolute humidity is lower than the absolute humidity of the internal air and is a state in which the water vapor adsorbed by the adsorption block 140 is being desorbed (the adsorption block 140 is being regenerated) when the absolute humidity is higher than the absolute humidity of the internal air.

(First Control Method)

The first control method in the vehicle air purification system 1 will be described with reference to FIG. 4. The first control method shown in FIG. 4 is a control method in which the control device 20 prevents water vapor desorbed from the adsorption block 140 from being contained in the purified air after the flow path is switched by changing a timing when the heating device 130 is turned off.

Figure 4:
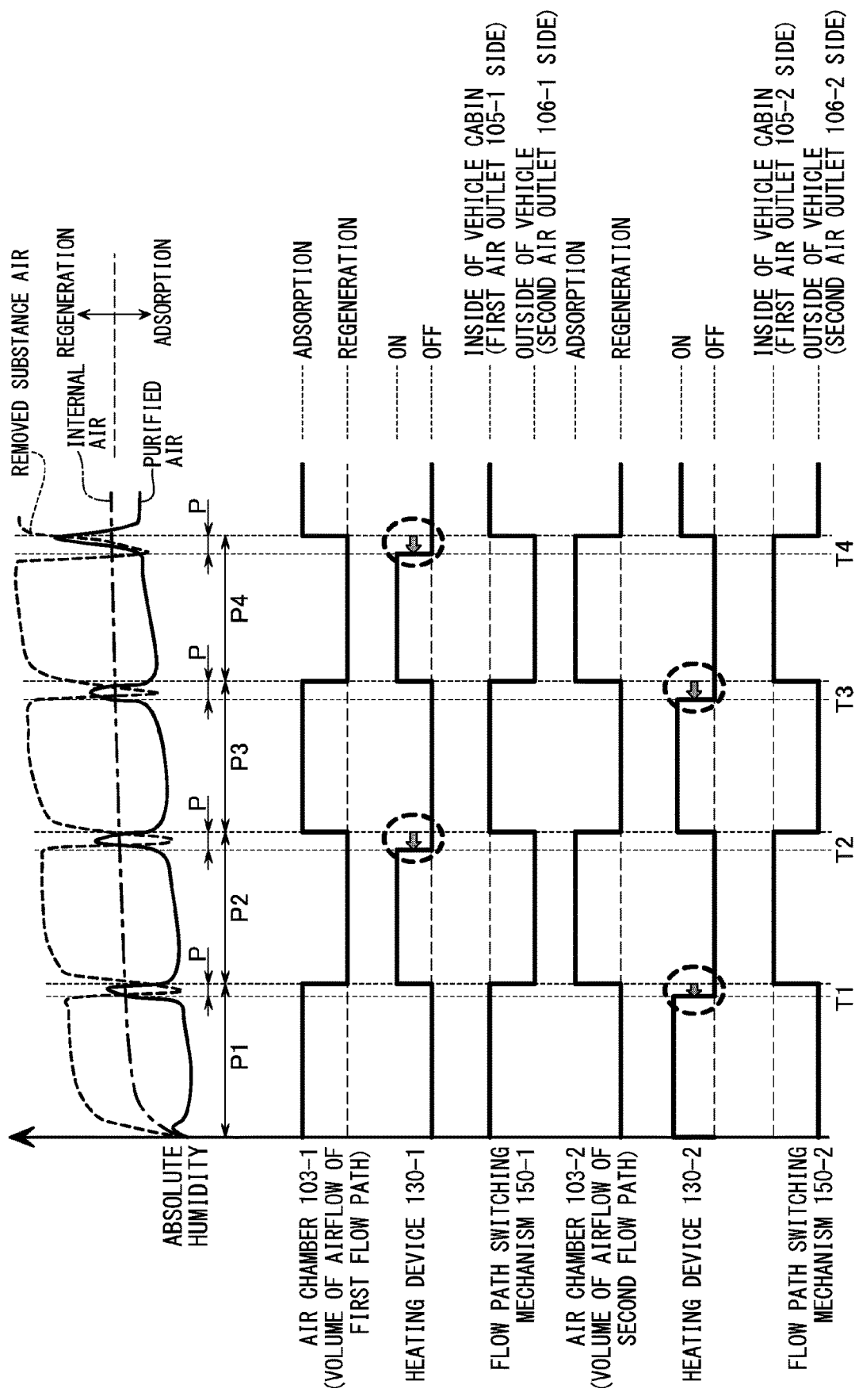
FIG. 4 is a diagram showing a first control method in the vehicle air purification system.

More specifically, in the first control method, as in the control of the heating device 130 indicated by a circled broken line in each purification period P shown in FIG. 4, the control device 20 turns off the heating device 130 disposed in the flow path for causing the adsorption block 140 to be regenerated at a timing which is a predetermined time period (for example, from about 30 [sec] to about 1 [min]) earlier than the time when the next purification period P starts. For example, in the purification period P1, the control device 20 turns off the second heating device 130-2 disposed in the second flow path for causing the second adsorption block 140-2 to be regenerated at time T1 before the time when the purification period P2 starts. Also, the timing of time T1 when the control device 20 turns off the second heating device 130-2 is a timing when a time period required for a state in which the internal air from which water vapor is removed after the flow path is switched is not heated by the residual heat from the second heating device 130-2 and the second adsorption block 140-2 removes the water vapor contained in the internal air when the purification period P2 starts is ensured. For example, the timing of time T1 at which the control device 20 turns off the second heating device 130-2 is a timing which is at least a time period corresponding to the period P in the comparative example earlier than the timing when the purification period P2 starts.

Thereby, in the first control method, a period in which a state in which the adsorption block 140 is regenerated by desorbing the adsorbed water vapor continues shown in the period P in FIG. 4 (the period corresponding to the period P in the comparative example) is advanced. In other words, in the first control method, the period shown in the period P is within the period of each purification period P. Thereby, the adsorption block 140 is in a state in which water vapor can already be adsorbed at the timing when the next purification period P starts.

As described above, in the first control method, the control device 20 is configured to cool the internal air to be passed by the adsorption block 140 to a temperature of a state in which the adsorption block 140 can adsorb the water vapor when the next purification period P is started by turning off the heating device 130 disposed in the flow path along which the previously removed water vapor is desorbed and air containing the desorbed water vapor is expelled outside of the electric vehicle at a timing which is a predetermined time period earlier than the time when each purification period P starts. As a result, in the first control method, it is possible to prevent a state in which the purified air containing the desorbed water vapor is returned to the vehicle cabin of the electric vehicle for a while after the control device 20 switches the flow path and the windshield of the vehicle is fogged up. Further, it is possible to reduce a used amount of electric power by shortening the on state of the heating device.

Also, it is only necessary for the timing of time T1, time T2, time T3, or time T4 shown in FIG. 4 to be a timing when a time period required for a state in which the internal air from which water vapor is removed after the flow path is switched is not heated by the residual heat from the heating device 130 and the adsorption block 140 removes the water vapor contained in the internal air when the next purification period P starts is ensured. Thus, the timing of time T1, time T2, time T3, or time T4 may be a timing adjusted on the basis of a result of monitoring the temperature of the adsorption block 140, the temperature of the purified air, the concentration of the purification target substances contained in the purified air, and the like.

(Second Control Method)

A second control method in the vehicle air purification system 1 will be described with reference to FIG. 5. The second control method shown in FIG. 5 is a control method in which the control device 20 prevents the water vapor desorbed from the adsorption block 140 from being contained in the purified air after the flow path is switched by controlling a volume of airflow of the internal air delivered to the air chamber 103 at a timing when the heating device 130 in the first control method is turned off.

Figure 5:
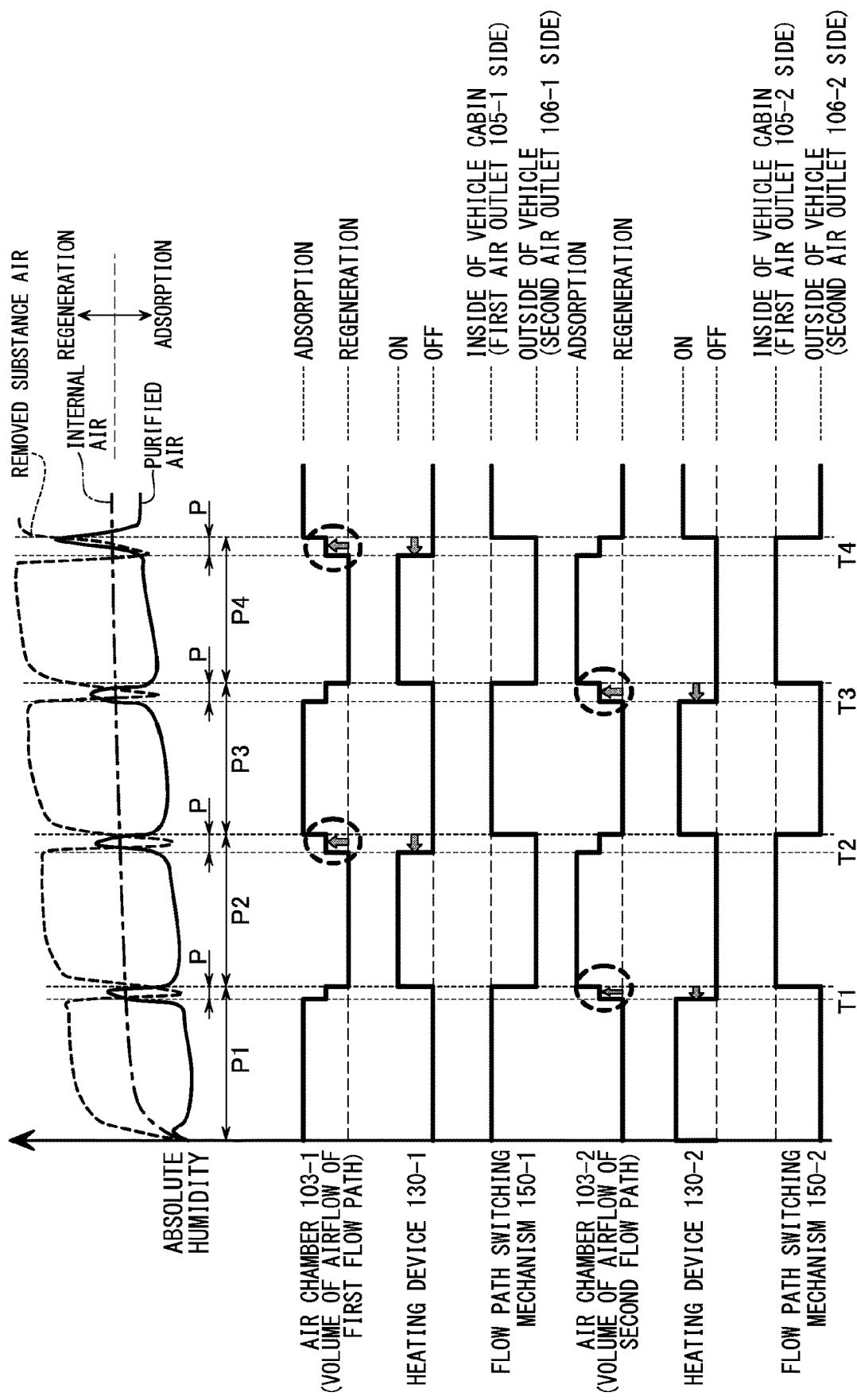
FIG. 5 is a diagram showing a second control method in the vehicle air purification system.

More specifically, in the second control method, as in the control of the air chamber 103 indicated by a circled broken line in each purification period P shown in FIG. 5, the control device 20 controls the air distribution mechanism 120 so that a proportion of the internal air to be distributed to the air chamber 103 disposed in the flow path for causing the adsorption block 140 to be regenerated at a timing which is a predetermined time period earlier than the time when the next purification period P starts is increased by a preset proportion. For example, in the purification period P1, the control device 20 increases the volume of airflow of the internal air flowing through the second flow path for causing the second adsorption block 140-2 to adsorb water vapor contained in the internal air from time T1 before the time when the purification period P2 starts, i.e., while the second heating device 130-2 is turned off in the purification period P1. Thereby, in the second control method, in each purification period P, the volume of airflow is lower than that when the purified air from which water vapor has been removed is returned to the vehicle cabin of the electric vehicle, but the volume of airflow of the internal air flowing through the air chamber 103 disposed in the flow path for causing the adsorption block 140 to be regenerated is increased while the heating device 130 is turned off. Also, in the second control method, when the control device 20 increases the proportion of the internal air distributed to the air chamber 103, the volume of airflow of the internal air flowing through the air chamber 103 disposed in the flow path for causing the adsorption block 140 to adsorb water vapor is decreased.

Thereby, in the second control method, in addition to the state of the first control method, the amount of internal air passing through the adsorption block 140, which is being regenerated, increases. Thereby, the adsorption block 140, which is being regenerated, is cooled earlier and the water vapor can be adsorbed more reliably than in the case of the first control method at the timing when the next purification period P starts.

As described above, in the second control method, as in the first control method, the control device 20 also turns off the heating device 130 disposed in a flow path for desorbing the previously removed water vapor and expelling air containing the water vapor outside of the electric vehicle at a timing which is a predetermined time period earlier than the time when each purification period P starts. Further, in the second control method, the control device 20 increases the proportion of internal air flowing through the flow path for desorbing the previously removed water vapor and expelling the air containing the water vapor outside of the electric vehicle in coordination with the timing when the heating device 130 is turned off in each purification period P. Thereby, when the next purification period P is started, the internal air which is allowed to pass through the adsorption block 140 is more reliably cooled to a temperature at which the adsorption block 140 can adsorb water vapor. As a result, in the second control method, as in the first control method, it is possible to prevent a state in which the purified air containing the desorbed water vapor is returned to the vehicle cabin of the electric vehicle for a while after the control device 20 switches the flow path and the windshield of the electric vehicle is fogged up.

Also, in the second control method, the adsorption block 140 regenerated by increasing the proportion of internal air flowing through a flow path for desorbing the previously removed carbon dioxide or water vapor and expelling air containing the carbon dioxide or water vapor outside of the electric vehicle can adsorb the water vapor earlier than in the first control method. Thus, in the second control method, a timing when the heating device 130 is turned off can be made later than that in the first control method. That is, timings of time T1, time T2, time T3, and time T4 shown in FIG. 5 can be set to be later than the timings of time T1, time T2, time T3, and time T4 in the first control method. Thereby, in the second control method, a time period used for regenerating the adsorption block 140 can be ensured more than in the first control method.

(Third Control Method)

A third control method in the vehicle air purification system 1 will be described with reference to FIG. 6. The third control method shown in FIG. 6 is a control method in which the control device 20 prevents water vapor desorbed from the adsorption block 140 from being contained in the purified air after the flow path is switched by changing the timing when the flow path switching mechanism 150 switches the air outlet for predominantly allowing air to flow through each flow path.

Figure 6:
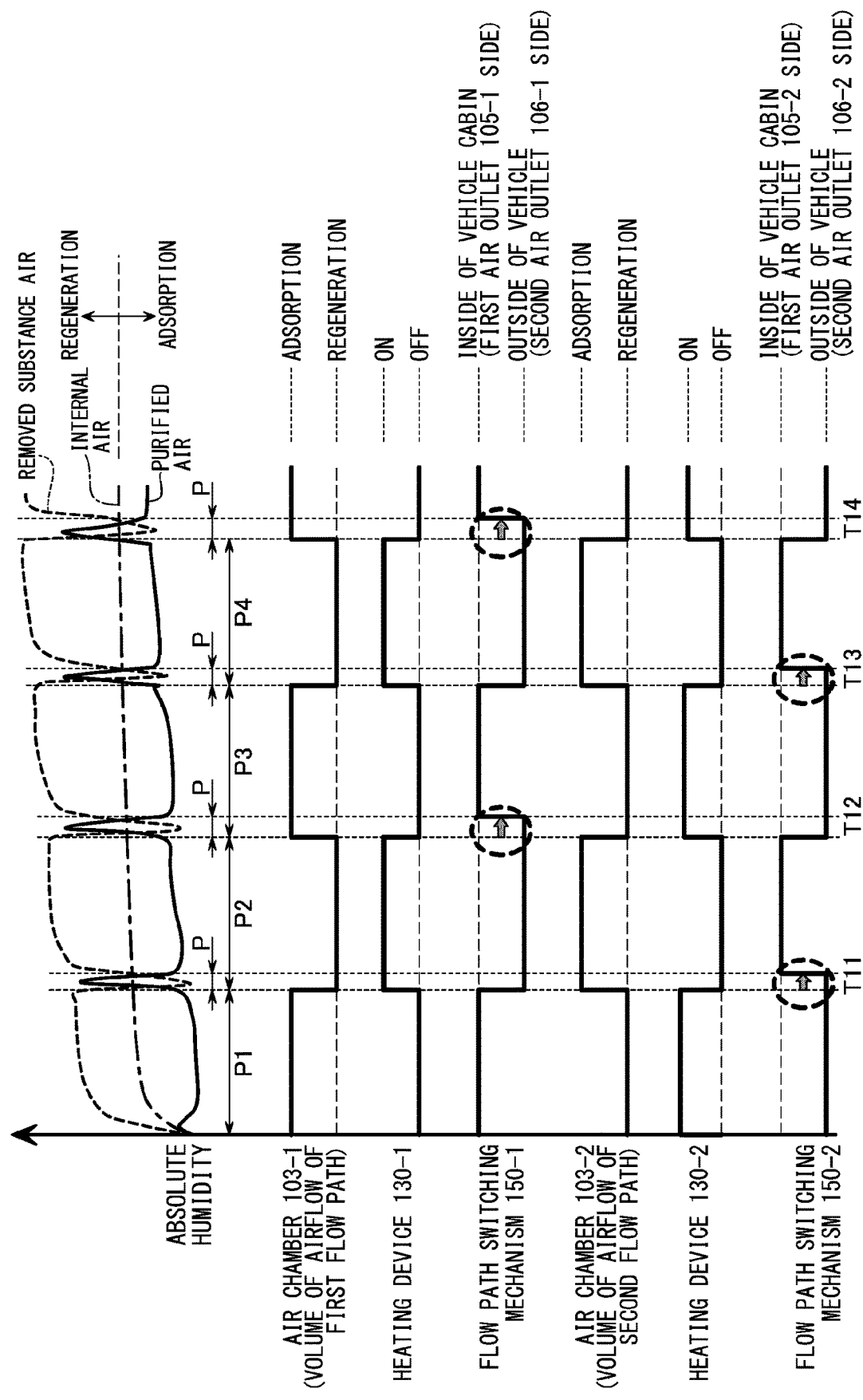
FIG. 6 is a diagram showing a third control method in the vehicle air purification system.

More specifically, in the third control method, as in the control of the flow path switching mechanism 150 indicated by a circled broken line in each purification period P shown in FIG. 6, the control device 20 causes the switching of the air outlet from the second air outlet 106 to the first air outlet 105 by the flow path switching mechanism 150 to be delayed by a predetermined time period (for example, from about 30 [sec] to about 1 [min]) from the initial time when the purification period P starts. For example, during a time period from the initial time when the purification period P2 starts to time T11 in the purification period P2, the control device 20 causes the switching of the air outlet from the 2-2$^{nd}$ air outlet 106-2 to the 2-1$^{st}$ air outlet 105-2 by the second flow path switching mechanism 150-2 to be delayed. That is, the control device 20 causes a state in which the second flow path switching mechanism 150-2 switches an air outlet for expelling air (removed substance air) delivered to the second air chamber 104-2 to the 2-2$^{nd}$ air outlet 106-2 to be continued during the purification period P1. Subsequently, at time T11, the control device 20 controls the second flow path switching mechanism 150-2, so that an air outlet for expelling the air (purified air) delivered to the second air chamber 104-2 is switched to the 2-1$^{st}$ air outlet 105-2. Also, a timing of time T11 when the control device 20 switches the air outlet of the air delivered to the second air chamber 104-2 is a timing for ensuring a time period required for a state in which heating by the residual heat from the second heating device 130-2 with respect to the internal air from which water vapor is removed after the flow path is switched subsides and the second adsorption block 140-2 removes the water vapor contained in the internal air. For example, the timing of time T11 at which the control device 20 causes the second flow path switching mechanism 150-2 to switch the air outlet is a timing which is at least a time period corresponding to the period P in the comparative example later than the timing when the purification period P2 starts.

Thereby, in the third control method, after a period in which a state in which the adsorption block 140 is regenerated by desorbing the adsorbed water vapor (a period corresponding to the period P in the comparative example) indicated by the period P in FIG. 6 continues ends, the purified air delivered to the air chamber 104 is expelled from the first air outlet 105 and returned to the vehicle cabin of the electric vehicle. In other words, in the third control method, heating is performed by the residual heat from the heating device 130 turned on to regenerate the adsorption block 140 in the previous purification period P and the purified air from which the water vapor previously adsorbed by the adsorption block 140 is also desorbed is expelled as the removed substance air from the second air outlet 106 outside of the electric vehicle in the current purification period P.

As described above, in the third control method, the control device 20 causes the switching of the air outlet for expelling the air delivered to the air chamber 104 by the flow path switching mechanism 150 to be delayed from the initial time when each purification period P starts to a timing when a predetermined time period has elapsed and therefore expels the purified air as the removed substance air outside of the electric vehicle in a state in which heating is performed by the residual heat from the heating device 130 that has been turned on in the previous purification period P and the water vapor previously adsorbed by the adsorption block 140 is desorbed during a delay time period. As a result, in the third control method, as in the first control method and the second control method, it is possible to prevent a state in which the purified air containing the desorbed water vapor is returned to the vehicle cabin of the electric vehicle for a while after the control device 20 switches the flow path and the windshield of the electric vehicle is fogged up.

Also, it is only necessary for the timing of time T11, time T12, time T13, and time T14 shown in FIG. 6 to be a timing for ensuring a time period required for a state in which heating by the residual heat from the heating device 130 with respect to the internal air from which water vapor is removed after the flow path is switched subsides and the adsorption block 140 removes the water vapor contained in the internal air. Thus, the timing of time T11, time T12, time T13, or time T14 may be a timing adjusted on the basis of a result of monitoring the temperature of the adsorption block 140, the temperature of the purified air which is expelled from the first air outlet 105, and the concentration of the purification target substances contained in the purified air, and the like. For example, the temperature of the adsorption block 140 and the temperature of the purified air detected by a temperature sensor and the like are monitored and the time when the monitored temperature becomes less than or equal to a preset temperature threshold value may be set as the timing of time T11, time T12, time T13, or time T14. Also, for example, the concentration of the purification target substances contained in the purified air detected by a concentration sensor or the like is monitored and the time when the monitored concentration becomes less than or equal to a preset concentration threshold value may be set as the timing of time T11, time T12, time T13, or time T14.

(Fourth Control Method)

Figure 7:
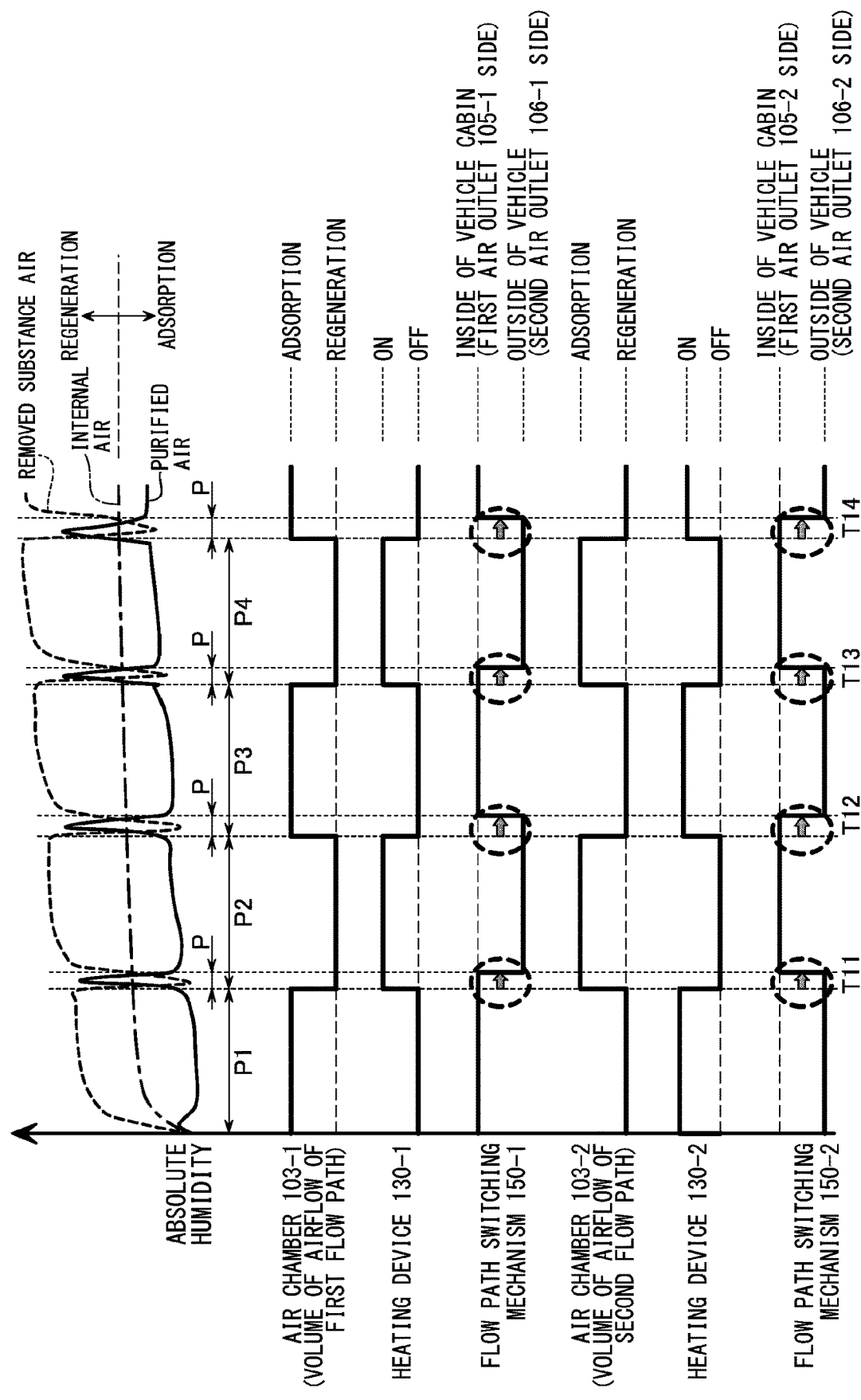
FIG. 7 is a diagram showing a fourth control method in the vehicle air purification system.

A fourth control method in the vehicle air purification system 1 will be described with reference to FIG. 7. The fourth control method shown in FIG. 7 is another control method of preventing water vapor desorbed from the adsorption block 140 from being contained in the purified air after the flow path is switched by changing a timing when the flow path switching mechanism 150 switches an air outlet for predominantly allowing air to flow through each flow path by the control device 20. In the fourth control method, a timing when the air outlet for expelling air is switched by the flow path switching mechanism 150 is different from that of the third control method.

More specifically, in the fourth control method, as in the control of the flow path switching mechanism 150 indicated by the circled broken line in each purification period P shown in FIG. 7, the control device 20 causes the switching of the air outlet by each flow path switching mechanism 150 to be delayed during a predetermined time period (for example, from about 30 [sec] to about 1 [min]) from the initial time when each purification period P starts. For example, during a time period from the initial time when the purification period P2 starts to time T11 in the purification period P2, the control device 20 causes both the switching of the air outlet from the 2-2$^{nd}$ air outlet 106-2 to the 2-1$^{st}$ air outlet 105-2 by the second flow path switching mechanism 150-2 and the switching of the air outlet from the 1-1$^{st}$ air outlet 105-1 to the 1-2$^{nd}$ air outlet 106-1 by the first flow path switching mechanism 150-1 to be delayed. That is, in the fourth control method, the control device 20 causes a timing when the first flow path switching mechanism 150-1 switches the air outlet to be delayed in addition to delaying a timing when the second flow path switching mechanism 150-2 switches the air outlet in the third control method. Also, the timing of time T11 at which the control device 20 causes the first flow path switching mechanism 150-1 and the second flow path switching mechanism 150-2 to switch the air outlet of the air delivered to the air chamber 104 is a timing based on a concept similar to that of the third control method.

Thereby, in the fourth control method, as in the third control method, heating is performed by the residual heat from the heating device 130 turned on to regenerate the adsorption block 140 in the previous purification period P and the purified air from which the water vapor previously adsorbed by the adsorption block 140 is also desorbed is expelled as the removed substance air from the second air outlet 106 outside of the electric vehicle in the current purification period P. Further, in the fourth control method, the removed substance air whose absolute humidity is lower than the absolute humidity of the internal air indicated in the period P in FIG. 7, i.e., the internal air from which the water vapor is being adsorbed by the adsorption block 140 without being heated to a temperature of a state in which the water vapor adsorbed by the adsorption block 140 is desorbed in each purification period P, is returned as the purified air from the flow path switching mechanism 150 to the vehicle cabin of the electric vehicle.

As described above, in the fourth control method, the control device 20 causes the switching of the air outlet for expelling the air delivered to the air chamber 104 by the flow path switching mechanism 150 to be delayed from the initial time when each purification period P starts to a timing when a predetermined time period has elapsed. Thereby, in the fourth control method, as in the third control method, heating is performed by the residual heat from the heating device 130 that has been turned on in the previous purification period P and therefore the purified air from which the water vapor previously adsorbed by the adsorption block 140 is desorbed is expelled as the removed substance air outside of the electric vehicle. As a result, in the fourth control method, as in the first to third control methods, it is possible to prevent a state in which the purified air containing the desorbed water vapor is returned to the vehicle cabin of the electric vehicle for a while after the control device 20 switches the flow path and the windshield of the electric vehicle is fogged up.

Further, in the fourth control method, the adsorption block 140 returns the removed substance air from which the water vapor is being desorbed by the adsorption block 140 is returned as the purified air to the vehicle cabin of the electric vehicle in the current purification period P during a delay time period in which the control device 20 delays switching of the air outlet in the flow path switching mechanism 150 is delayed in each purification period P. As a result, in the fourth control method, the removed substance air from which water vapor has been removed indicated by the change in absolute humidity in FIG. 7 can be effectively used as purified air without being expelled outside of the electric vehicle.

(Fifth Control Method)

A fifth control method in the vehicle air purification system 1 will be described with reference to FIG. 8. The fifth control method shown in FIG. 8 is a control method in which the control device 20 prevents water vapor desorbed from the adsorption block 140 from being contained in the purified air after the flow path is switched by controlling a volume of airflow of the internal air delivered to the air chamber 103 together with a change in a timing when the flow path switching mechanism 150 switches the air outlet for predominantly allowing air to flow through each flow path in the third control method.

Figure 8:
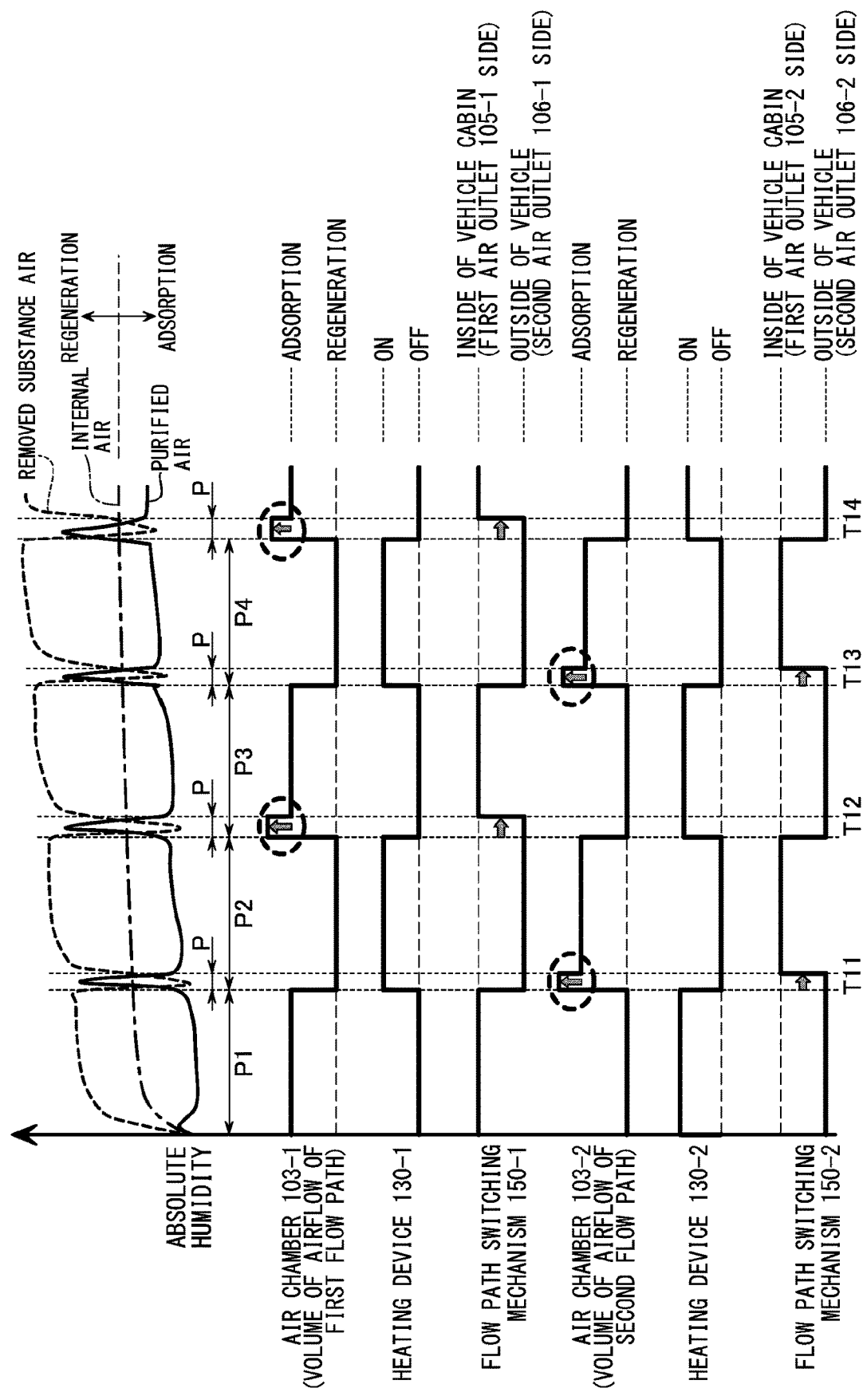
FIG. 8 is a diagram showing a fifth control method in the vehicle air purification system.

More specifically, in the fifth control method, as in the control of the air chamber 103 indicated by a circled broken line in each purification period P shown in FIG. 8, the control device 20 controls the blower 110 so that a volume of airflow of the internal air suctioned from the air inlet 101 and delivered to the air chamber 102 is increased and controls the air distribution mechanism 120 so that a proportion of the internal air distributed to a flow path of the side on which water vapor contained in the internal air is adsorbed by the adsorption block 140 is increased by a preset proportion while the switching of the air outlet by each flow path switching mechanism 150 is delayed. For example, during a time period from the initial time when the purification period P2 starts to time T11 in the purification period P2, the control device 20 controls the blower 110, so that a volume of airflow of the internal air suctioned from the air inlet 101 and delivered to the air chamber 102 is increased, and controls the air distribution mechanism 120, so that a volume of airflow of the internal air flowing through the second flow path for causing the second adsorption block 140-2 to adsorb water vapor contained in the internal air is increased by increasing the proportion of the internal air distributed to the air chamber 103-2. Thereby, in the fifth control method, a volume of airflow of internal air flowing through the air chamber 103 disposed in a flow path of a side on which water vapor is adsorbed by the adsorption block 140 is increased while the switching of the air outlet by each flow path switching mechanism 150 is delayed in each purification period P. Also, in the fifth control method, the control device 20 is configured so that a volume of airflow of the internal air flowing through the air chamber 103 disposed in the flow path for causing the adsorption block 140 to be regenerated does not change by controlling the air distribution mechanism 120 so that a proportion of the internal air distributed to a flow path of a side on which the adsorption block 140 is regenerated decreases while the switching of the air outlet by the flow path switching mechanism 150 is delayed in each purification period P.

Thereby, in the fifth control method, in addition to the state of the third control method, an amount of internal air passing through the adsorption block 140 that adsorbs water vapor increases. Thereby, the adsorption block 140 that adsorbs water vapor in the current purification period P, i.e., the adsorption block 140 in a state in which internal air heated by the heating device 130 passes in the previous purification period P and previously adsorbed water vapor is also desorbed in the current purification period P, is cooled earlier and can adsorb the water vapor until the air outlet is switched by the flow path switching mechanism 150.

As described above, in the fifth control method, as in the third control method, the control device 20 causes the switching of the air outlet for expelling the air delivered to the air chamber 104 by the flow path switching mechanism 150 to be delayed in each purification period P and therefore expels the purified air as the removed substance air outside of the electric vehicle in a state in which heating is performed by the residual heat from the heating device 130 that has been turned on in the previous purification period P and the water vapor previously adsorbed by the adsorption block 140 is desorbed during a delay time period. As a result, in the fifth control method, as in the first to fourth control methods, it is possible to prevent a state in which the purified air containing the desorbed water vapor is returned to the vehicle cabin of the electric vehicle for a while after the control device 20 switches the flow path and the windshield of the electric vehicle is fogged up.

Further, in the fifth control method, the control device 20 increases the volume of airflow of the internal air flowing through a flow path for returning purified air from which water vapor has been removed to the vehicle cabin of the electric vehicle while the switching of the air outlet by the flow path switching mechanism 150 is delayed in each purification period P. As a result, in the fifth control method, the adsorption block 140 for removing water vapor is earlier cooled to a temperature at which water vapor can be adsorbed.

Also, a case in which control of a volume of airflow of the internal air delivered to the air chamber 103 is added to the third control method has been described in the fifth control method. However, a concept that the control of the volume of airflow of the internal air delivered to the air chamber 103 is added in the fifth control method is not limited to the application to the third control method and may be applied to the fourth control method. That is, the control of the volume of airflow of the internal air delivered to the air chamber 103 may be added to the fourth control method. In the control method in this case, in addition to the effect of the fourth control method, it is possible to simultaneously obtain the effect of the fifth control method in which the adsorption block 140 for removing water vapor is earlier cooled to a temperature at which water vapor can be adsorbed.

(Sixth Control Method)

Figure 9:
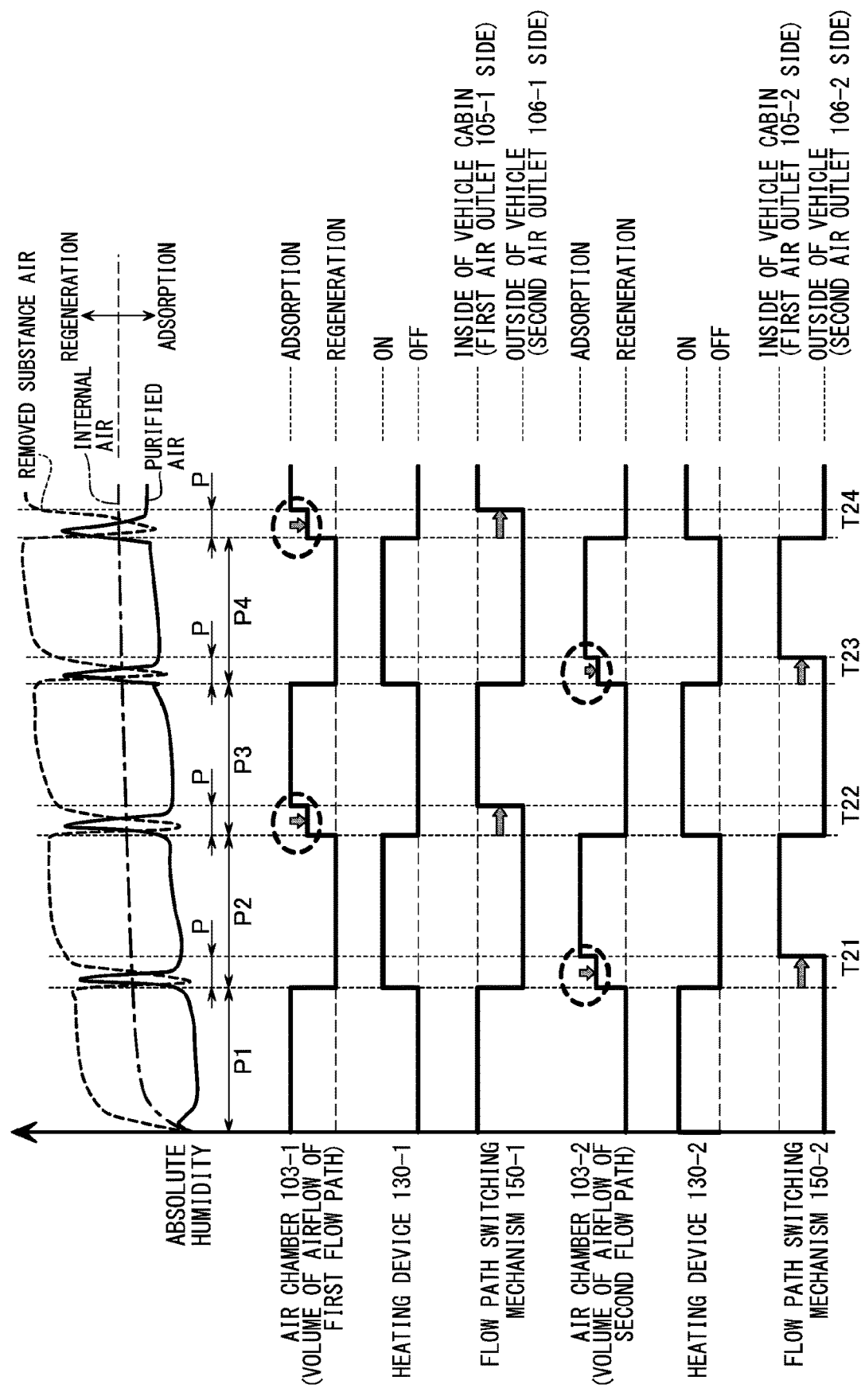
FIG. 9 is a diagram showing a sixth control method in the vehicle air purification system.

A sixth control method in the vehicle air purification system 1 will be described with reference to FIG. 9. The sixth control method shown in FIG. 9 is another control method in which the control device 20 prevents water vapor desorbed from the adsorption block 140 from being contained in the purified air after the flow path is switched by controlling a volume of airflow of the internal air delivered to the air chamber 103 along with a change in a timing when the flow path switching mechanism 150 switches the air outlet for predominantly flowing air through each flow path in the third control method. In the sixth control method, the control of the volume of airflow of the internal air delivered to the air chamber 103 is different from that of the fifth control method.

More specifically, in the sixth control method, as in the control of the air chamber 103 indicated by a circled broken line in each purification period P shown in FIG. 8, the control device 20 controls the blower 110 so that a volume of airflow of the internal air suctioned from the air inlet 101 and delivered to the air chamber 102 is decreased and controls the air distribution mechanism 120 so that a proportion of the internal air distributed to a flow path of the side on which water vapor contained in the internal air is adsorbed by the adsorption block 140 is decreased by a preset proportion while the switching of the air outlet by each flow path switching mechanism 150 is delayed. For example, during a time period from the initial time when the purification period P2 starts to time T21 in the purification period P2, the control device 20 controls the blower 110 so that a volume of airflow suctioned from the air inlet 101 and delivered to the air chamber 102 is decreased and controls the air distribution mechanism 120 so that a volume of airflow of the internal air flowing through the second flow path for causing the second adsorption block 140-2 to adsorb water vapor contained in the internal air is decreased by decreasing the proportion of the internal air distributed to the second air chamber 103-2. Thereby, in the sixth control method, a volume of airflow of internal air flowing through the air chamber 103 disposed in a flow path of a side on which water vapor is adsorbed by the adsorption block 140 is decreased while the switching of the air outlet by each flow path switching mechanism 150 is delayed in each purification period P. In the sixth control method, the control device 20 is configured so that a volume of airflow of the internal air flowing through the air chamber 103 disposed in the flow path for causing the adsorption block 140 to be regenerated does not change by controlling the air distribution mechanism 120 so that a proportion of the internal air distributed to a flow path of a side on which the adsorption block 140 is regenerated decreases while the switching of the air outlet by the flow path switching mechanism 150 is delayed in each purification period P.

Thereby, in the sixth control method, as in the third control method, the purified air is expelled as the removed substance air from the second air outlet 106 outside of the electric vehicle in a state in which heating is performed by the residual heat from the heating device 130 turned on to regenerate the adsorption block 140 in the previous purification period P and the water vapor previously adsorbed by the adsorption block 140 is desorbed in the current purification period P. Here, although the purified air expelled from the second air outlet 106 outside of the electric vehicle as the removed substance air is in a state in which the water vapor previously adsorbed by the adsorption block 140 has been desorbed in the current purification period P, it is possible to effectively utilize energy of the residual heat (for example, thermal energy or the like) because air is heated by the residual heat from the heating device 130. That is, it is considered that expelling the purified air having the energy capable of being utilized outside of the electric vehicle indicates that the energy is lost in the vehicle air purification device 10. Thus, in the sixth control method, an amount of internal air passing through the adsorption block 140 that adsorbs water vapor is reduced while the flow path switching mechanism 150 is allowed to delay the switching of the air outlet in the current purification period P. As a result, in the sixth control method, the adsorption block 140 that adsorbs water vapor is cooled, the amount of purified air that is expelled from the second air outlet 106 outside of the electric vehicle as the removed substance air is limited, and the energy loss in the vehicle air purification device 10 can be decreased.

As described above, in the sixth control method, as in the third control method, the control device 20 also causes the switching of the air outlet for expelling the air delivered to the air chamber 104 by the flow path switching mechanism 150 to be delayed in each purification period P and decreases an amount of internal air passing through the adsorption block 140 for adsorbing water vapor during a delay time period in each purification period P. As a result, in the sixth control method, as in the first to fifth control methods, it is possible to prevent a state in which the purified air containing the desorbed water vapor is returned to the vehicle cabin of the electric vehicle for a while after the control device 20 switches the flow path and the windshield of the electric vehicle is fogged up and it is possible to decrease an amount of purified air expelled outside of the electric vehicle as removed substance air and decrease the energy loss in the vehicle air purification device 10.

Also, as in the third to fifth control methods, it is only necessary for the timing of time T21, time T22, time T23, or time T24 shown in FIG. 9 to be a timing for ensuring a time period required for a state in which heating by the residual heat from the heating device 130 with respect to the internal air from which water vapor is removed after the flow path is switched subsides and the adsorption block 140 removes the water vapor contained in the internal air. Thus, the timing of time T21, time T22, time T23, or time T24 may be, for example, a timing adjusted on the basis of a result of monitoring the temperature of the adsorption block 140 detected by the temperature sensor or the like, the temperature of the purified air which is expelled from the first air outlet 105, and a result of monitoring the concentration of the purification target substances contained in the purified air detected by, for example, the concentration sensor or the like, and the like.

Also, in the sixth control method, as in the fifth control method, a case in which the control of the volume of airflow of the internal air delivered to the air chamber 103 is added to the third control method has also been described. However, as in the fifth control method, a concept that the control of the volume of airflow of the internal air delivered to the air chamber 103 is added in the sixth control method is not limited to the application to the third control method and may be applied to the fourth control method. In the control method in this case, in addition to the effect of the fourth control method, it is possible to simultaneously obtain the effect of the sixth control method in which the energy loss in the vehicle air purification device 10 is decreased while the adsorption block 140 is cooled to a temperature at which water vapor can be adsorbed.

According to the above-described control method, the control device 20 controls operations of the blower 110, the air distribution mechanism 120, the heating device 130, and the flow path switching mechanism 150 provided in the vehicle air purification device 10, so that switching is performed between the adsorption of water vapor from the internal air within the vehicle cabin of the electric vehicle and the desorption of the previously adsorbed water vapor by the adsorption block 140 disposed in each flow path in the vehicle air purification device 10. In other words, the control device 20 switches the flow path between the flow path for returning the purified air from which water vapor is adsorbed by the adsorption block 140 to the vehicle cabin of the electric vehicle and the flow path for expelling the removed substance air used for desorbing the water vapor adsorbed on the adsorption block 140 outside of the electric vehicle. At this time, the control device 20 switches a flow path so that a flow path of one adsorption block 140 is set as a flow path for returning the purified air to the vehicle cabin of the electric vehicle and a flow path of the other adsorption block 140 is set as a flow path for expelling the removed substance air outside of the electric vehicle. Thereby, in the vehicle air purification device 10 of the vehicle air purification system 1, while the adsorption block 140 disposed in one of the flow paths adsorbs water vapor, the adsorption block 140 disposed in the other flow path is regenerated by desorbing the previously adsorbed water vapor. That is, in the vehicle air purification system 1, the vehicle air purification device 10 simultaneously performs the operation of returning the purified air obtained by removing water vapor from the internal air within the vehicle cabin of the electric vehicle to the vehicle cabin of the electric vehicle and the operation of expelling the removed substance air, which has been used to expel the previously removed water vapor outside of the electric vehicle, outside of the electric vehicle. The control device 20 iterates switching between the flow path for returning the purified air to the vehicle cabin of the electric vehicle and the flow path for expelling the removed substance air outside of the electric vehicle at each predetermined timing. Thereby, in the vehicle air purification system 1, the vehicle air purification device 10 continuously performs the delivery of the purified air to the vehicle cabin and the delivery (expelling) of the removed substance air outside of the vehicle.

Also, as described above, in the first to sixth control methods, the flow path may be switched by the control device 20 between the flow path for returning purified air to the vehicle cabin of an electric vehicle and the flow path for expelling removed substance air outside of the electric vehicle by combining a plurality of methods within the first to sixth control methods instead of a control method to be exclusively performed by the control device 20 in the vehicle air purification system 1.

Also, in the first to sixth control methods, a case in which water vapor is removed from the internal air by the vehicle air purification device 10 has been described. However, as described above, the adsorption block 140 disposed in each flow path in the vehicle air purification device 10 adsorbs at least carbon dioxide and water vapor and desorbs the adsorbed carbon dioxide and water vapor according to regeneration. However, the control process of the control device 20 when the adsorption block 140 disposed in each flow path in the vehicle air purification device 10 removes carbon dioxide can be similarly considered by replacing the above-described water vapor with carbon dioxide. Accordingly, detailed description of the control process of the control device 20 when the vehicle air purification device 10 removes carbon dioxide will be omitted.

As described above, according to the mode for carrying out the present invention, the control device 20 controls operations of the blower 110, the air distribution mechanism 120, the heating device 130, and the flow path switching mechanism 150 provided in the vehicle air purification device 10, so that switching between flow paths including one of the flow paths provided in the vehicle air purification device 10 set as the flow path for returning the internal air (purified air) from which the adsorption block 140 has removed the purification target substances to the vehicle cabin of the electric vehicle and the other flow path set as the flow path for desorbing the purification target substances previously adsorbed by the adsorption block 140 and expelling the air after regeneration (the removed substance air) outside of the electric vehicle is iterated at each predetermined timing. Thereby, in the mode for carrying out the present invention, the vehicle air purification device 10 simultaneously performs an operation of returning the purified air to the vehicle cabin of the electric vehicle and an operation of expelling the removed substance air outside of the electric vehicle. Also, in the vehicle air purification device 10, while the adsorption block 140 disposed in one of the flow paths adsorbs the purification target substances, the adsorption block 140 disposed in the other flow path is regenerated by desorbing the purification target substances.

Thereby, in the electric vehicle equipped with the vehicle air purification system 1 of the mode for carrying out the present invention, even if the air conditioning system is operated in the internal air circulation mode in which the temperature is adjusted while the air is circulated in the vehicle cabin, the vehicle air purification system 1 can cause the purified air obtained by removing the purification target substances from the internal air within the vehicle cabin to be circulated. Thus, when an electric vehicle equipped with the vehicle air purification system 1 of the mode for carrying out the present invention is used during, for example, the winter period, even if the air conditioning system is operated in the internal air circulation mode, the purified air returned to the vehicle cabin of the electric vehicle by the vehicle air purification device 10 prevents the windshield of the electric vehicle from being fogged up or does not affect the physical condition of the user of the vehicle. This is also similar to a case of a configuration in which, when the air conditioning system of the electric vehicle equipped with the vehicle air purification system 1 of the mode for carrying out the present invention operates in an external air introduction mode in which air outside the vehicle (external air) is suctioned, internal air is mixed with the suctioned external air at a preset ratio so that power consumption of a battery, which is a drive source of the electric vehicle, is reduced.

Moreover, in the mode for carrying out the present invention, the vehicle air purification device 10 constituting the vehicle air purification system 1 has two flow paths for removing the purification target substances and purifying the internal air and the control device 20 constituting the vehicle air purification system 1 alternately switches the flow path to continuously perform the delivery of the purified air to the vehicle cabin and the delivery (expelling) of the removed substance air outside of the vehicle. In the mode for carrying out the present invention, even if the vehicle air purification device 10 is continuously operated, it is possible to determine a time interval for alternately switching the flow path between the flow path for returning the purified air to the vehicle cabin of the electric vehicle and the flow path for expelling the removed substance air outside of the electric vehicle on the basis of purification performance of the adsorption block 140 disposed in each flow path in the vehicle air purification device 10. Thereby, in the mode for carrying out the present invention, it is possible to continue an operation of removing the purification target substances (carbon dioxide and water vapor) for a long time even though the adsorption block 140 containing a larger capacity of the adsorption material is not disposed in each flow path of the vehicle air purification device 10 so that the purification performance of the adsorption block 140 is improved. Thereby, in the mode for carrying out the present invention, it is possible to easily implement a small size of the vehicle air purification device 10 constituting the vehicle air purification system 1 together with a configuration in which the purification target substances are continuously removed from the internal air for a long time.

Also, in the mode for carrying out the present invention, an example in which the vehicle equipped with the vehicle air purification system 1 is an electric vehicle that travels using electric power supplied from the battery has been described. However, although the effect of limiting the power consumption of the battery in the vehicle air purification system 1 is mainly effective for electric vehicles, the effect that the purification target substances in the vehicle air purification system 1 are continuously removed for a long time is not an effect effective only for electric vehicles. That is, the effect that the purification target substances in the vehicle air purification system 1 can be continuously removed for a long time is, for example, an effective effect in a four-wheeled vehicle such as an automobile that travels according to driving by an internal combustion engine such as a diesel engine or a gasoline engine. Accordingly, the vehicle equipped with the vehicle air purification system 1 is not limited to an electric vehicle and includes all types of vehicles such as a vehicle that travels according to driving by an internal combustion engine and a hybrid vehicle that travels according to driving by a combination of a battery and an internal combustion engine as long as a vehicle includes a vehicle cabin where an air conditioning system adjusts the temperature of air.

Although modes for carrying out the present invention have been described above using the embodiments, the present invention is not limited to the embodiments and various modifications and replacements can be applied without departing from the spirit and scope of the present invention.

What is claimed is:

1. A vehicle air purification system comprising:
a first flow path configured to communicate with a vehicle cabin;
a second flow path configured to communicate with the vehicle cabin;
a blower configured to circulate air from the vehicle cabin toward the first flow path and the second flow path;
an air distribution mechanism configured to distribute and deliver air flowing from the vehicle cabin to one end of the first flow path and one end of the second flow path;
a 1-1st flow path connected to the other end of the first flow path and configured to communicate with the vehicle cabin;
a 1-2nd flow path connected to the other end of the first flow path and configured to communicate with the outside of the vehicle cabin;
a first heating device which is a heating device disposed in the first flow path and configured to heat air inside the first flow path;
a first adsorption block which is an adsorption block disposed in the first flow path and configured to adsorb at least carbon dioxide and water vapor contained in the air inside the first flow path as purification target substances and desorb the purification target substances when the air heated by the first heating device is allowed to pass;
a first flow path switching mechanism which is a flow path switching mechanism disposed in the first flow path and configured to predominantly allow air, which has passed through the first adsorption block, to flow through either the 1-1st flow path or the 1-2nd flow path;
a 2-1st flow path connected to the other end of the second flow path and configured to communicate with the vehicle cabin;
a 2-2nd flow path connected to the other end of the second flow path and configured to communicate with the outside of the vehicle cabin;
a second heating device which is a heating device disposed in the second flow path and configured to heat air inside the second flow path;
a second adsorption block which is an adsorption block disposed in the second flow path and configured to adsorb the purification target substances contained in the air inside the second flow path and desorb the purification target substances when the air heated by the second heating device is allowed to pass;

a second flow path switching mechanism which is a flow path switching mechanism disposed in the second flow path and configured to predominantly allow air, which has passed through the second adsorption block, to flow through either the 2-1st flow path or the 2-2nd flow path; and a control device configured to alternately implement a first state in which the first flow path switching mechanism predominantly allows the air, which has passed through the first adsorption block, to flow through the 1-1st flow path without operating the first heating device and the second flow path switching mechanism predominantly allows the air, which has passed through the second adsorption block, to flow through the 2-2nd flow path by operating the second heating device and a second state in which the first flow path switching mechanism predominantly allows the air, which has passed through the first adsorption block, to flow through the 1-2nd flow path by operating the first heating device and the second flow path switching mechanism predominantly allows the air, which has passed through the second adsorption block, to flow through the 2-1st flow path without operating the second heating device, wherein when the state is switched between the first state and the second state, the control device controls components at a timing that can inhibit the flow of the air from a flow path on which the purification target substances are being desorbed among the first flow path and the second flow path to the vehicle cabin, wherein, when the state is switched from the first state to the second state, the control device causes the second heating device in operation to be stopped before the state is switched from a state in which the second flow path switching mechanism predominantly allows the air, which has passed through the second adsorption block, to flow through the 2-2nd flow path to a state in which the second flow path switching mechanism predominantly allows the air, which has passed through the second adsorption block, to flow through the 2-1st flow path, wherein, when the state is switched from the second state to the first state, the control device causes the first heating device in operation to be stopped before the state is switched from a state in which the first flow path switching mechanism predominantly allows the air, which has passed through the first adsorption block, to flow through the 1-2nd flow path to a state in which the first flow path switching mechanism predominantly allows the air, which has passed through the first adsorption block, to flow through the 1-1st flow path, and wherein the control device performs time measurement with a timer from previous flow path switching by the first flow path switching mechanism and previous flow path switching by the second flow path switching mechanism and causes one of the heating devices to be stopped at a predetermined time.

2. The vehicle purification system according to claim 1, wherein the control device increases a proportion of the air to be distributed and delivered to the side on which the purification target substances are being desorbed by the air distribution mechanism in coordination with stopping of one of the heating devices as compared with a proportion of the air before the one of the heating devices is stopped.

3. The vehicle air purification system according to claim 1, wherein, when the state is switched from the first state to the second state, the control device causes switching from a state in which the second flow path switching mechanism predominantly allows the air, which has passed through the second adsorption block, to flow through the 2-2nd flow path to a state in which the second flow path switching mechanism predominantly allows the air, which has passed through the second adsorption block, to flow through the 2-1st flow path to be delayed, and wherein, when the state is switched from the second state to the first state, the control device causes switching from a state in which the first flow path switching mechanism predominantly allows the air, which has passed through the first adsorption block, to flow through the 1-2nd flow path to a state in which the first flow path switching mechanism predominantly allows the air, which has passed through the first adsorption block, to flow through the 1-1st flow path to be delayed.

4. A vehicle air purification system comprising:

a first flow path configured to communicate with a vehicle cabin;

a second flow path configured to communicate with the vehicle cabin;

a blower configured to circulate air from the vehicle cabin toward the first flow path and the second flow path;

an air distribution mechanism configured to distribute and deliver air flowing from the vehicle cabin to one end of the first flow path and one end of the second flow path;

a 1-1st flow path connected to the other end of the first flow path and configured to communicate with the vehicle cabin;

a 1-2nd flow path connected to the other end of the first flow path and configured to communicate with the outside of the vehicle cabin;

a first heating device which is a heating device disposed in the first flow path and configured to heat air inside the first flow path;

a first adsorption block which is an adsorption block disposed in the first flow path and configured to adsorb at least carbon dioxide and water vapor contained in the air inside the first flow path as purification target substances and desorb the purification target substances when the air heated by the first heating device is allowed to pass;

a first flow path switching mechanism which is a flow path switching mechanism disposed in the first flow path and configured to predominantly allow air, which has passed through the first adsorption block, to flow through either the 1-1st flow path or the 1-2nd flow path;

a 2-1st flow path connected to the other end of the second flow path and configured to communicate with the vehicle cabin;

a 2-2nd flow path connected to the other end of the second flow path and configured to communicate with the outside of the vehicle cabin;

a second heating device which is a heating device disposed in the second flow path and configured to heat air inside the second flow path;

a second adsorption block which is an adsorption block disposed in the second flow path and configured to adsorb the purification target substances contained in the air inside the second flow path and desorb the purification target substances when the air heated by the second heating device is allowed to pass;

a second flow path switching mechanism which is a flow path switching mechanism disposed in the second flow path and configured to predominantly allow air, which has passed through the second adsorption block, to flow through either the 2-1st flow path or the 2-2nd flow path; and a control device configured to alternately implement a first state in which the first flow path switching mechanism predominantly allows the air, which has passed through the first adsorption block, to flow through the 1-1st flow path without operating the first heating device and the second flow path switching mechanism predominantly allows the air, which has passed through the second adsorption block, to flow through the 2-2nd flow path by operating the second heating device and a second state in which the first flow path switching mechanism predominantly allows the air, which has passed through the first adsorption block, to flow through the 1-2nd flow path by operating the first heating device and the second flow path switching mechanism predominantly allows the air, which has passed through the second adsorption block, to flow through the 2-1st flow path without operating the second heating device, wherein, when the state is switched between the first state and the second state, the control device controls components at a timing that can inhibit the flow of the air from a flow path on which the purification target substances are being desorbed among the first flow path and the second flow path to the vehicle cabin, wherein, when the state is switched from the first state to the second state, the control device causes switching from a state in which the second flow path switching mechanism predominantly allows the air, which has passed through the second adsorption block, to flow through the 2-2nd flow path to a state in which the second flow path switching mechanism predominantly allows the air, which has passed through the second adsorption block, to flow through the 2-1st flow path to be delayed, wherein, when the state is switched from the second state to the first state, the control device causes switching from a state in which the first flow path switching mechanism predominantly allows the air, which has passed through the first adsorption block, to flow through the 1-2nd flow path to a state in which the first flow path switching mechanism predominantly allows the air, which has passed through the first adsorption block, to flow through the 1-1st flow path to be delayed, and wherein the control device performs time measurement with a timer from switching from the first state to the second state and switching from the second state to the first state and causes switching of a state in which the air is predominantly allowed to flow by one of the flow path switching mechanisms to be delayed until a predetermined time is reached.

5. The vehicle air purification system according to claim 4, wherein the control device monitors a temperature of one of the adsorption blocks disposed in the flow path of the side on which the purification target substances are being desorbed, detected by a temperature sensor, from the switching from the first state to the second state and the switching from the second state to the first state and causes switching of a state in which the air is predominantly allowed to flow by one of the flow path switching mechanisms to be delayed until the monitored temperature is less than or equal to a preset threshold value of the temperature.

6. The vehicle air purification system according to claim 4, wherein the control device monitors a temperature of one of the adsorption blocks disposed in the flow path of the side on which the purification target substances are being desorbed, detected by a temperature sensor, from the switching from the first state to the second state and the switching from the second state to the first state and causes switching of a state in which the air is predominantly allowed to flow by one of the flow path switching mechanisms to be delayed until the monitored temperature is less than or equal to a preset threshold value of the temperature.

7. A vehicle air purification system comprising:
a first flow path configured to communicate with a vehicle cabin;
a second flow path configured to communicate with the vehicle cabin;
a blower configured to circulate air from the vehicle cabin toward the first flow path and the second flow path;
an air distribution mechanism configured to distribute and deliver air flowing from the vehicle cabin to one end of the first flow path and one end of the second flow path;
a 1-1st flow path connected to the other end of the first flow path and configured to communicate with the vehicle cabin;
a 1-2nd flow path connected to the other end of the first flow path and configured to communicate with the outside of the vehicle cabin;
a first heating device which is a heating device disposed in the first flow path and configured to heat air inside the first flow path;
a first adsorption block which is an adsorption block disposed in the first flow path and configured to adsorb at least carbon dioxide and water vapor contained in the air inside the first flow path as purification target substances and desorb the purification target substances when the air heated by the first heating device is allowed to pass;
a first flow path switching mechanism which is a flow path switching mechanism disposed in the first flow path and configured to predominantly allow air, which has passed through the first adsorption block, to flow through either the 1-1st flow path or the 1-2nd flow path;
a 2-1st flow path connected to the other end of the second flow path and configured to communicate with the vehicle cabin;
a 2-2nd flow path connected to the other end of the second flow path and configured to communicate with the outside of the vehicle cabin;
a second heating device which is a heating device disposed in the second flow path and configured to heat air inside the second flow path;
a second adsorption block which is an adsorption block disposed in the second flow path and configured to adsorb the purification target substances contained in the air inside the second flow path and desorb the purification target substances when the air heated by the second heating device is allowed to pass;
a second flow path switching mechanism which is a flow path switching mechanism disposed in the second flow path and configured to predominantly allow air, which has passed through the second adsorption block, to flow through either the 2-1st flow path or the 2-2nd flow path; and a control device configured to alternately implement a first state in which the first flow path switching mechanism predominantly allows the air, which has passed through the first adsorption block, to flow through the 1-1st flow path without operating the first heating device and the second flow path switching mechanism predominantly allows the air, which has passed through the second adsorption block, to flow through the 2-2nd flow path by operating the second heating device and a second state in which the first flow path switching mechanism predominantly allows the air, which has passed through the first adsorption block, to flow through the 1-2nd flow path by operating the first heating device and the second flow path switching mechanism predominantly allows the air, which has passed through the second adsorption block, to flow through the 2-1st flow path without operating the second heating device, wherein, when the state is switched between the first state and the second state, the control device controls components at a timing that can inhibit the flow of the air from a flow path on which the purification target substances are being desorbed among the first flow path and the second flow path to the vehicle cabin, wherein, when the state is switched from the first state to the second state, the control device causes switching from a state in which the second flow path switching mechanism predominantly allows the air, which has passed through the second adsorption block, to flow through the 2-2nd flow path to a state in which the second flow path switching mechanism predominantly allows the air, which has passed through the second adsorption block, to flow through the 2-1st flow path to be delayed, wherein, when the state is switched from the second state to the first state, the control device causes switching from a state in which the first flow path switching mechanism predominantly allows the air, which has passed through the first adsorption block, to flow through the 1-2nd flow path to a state in which the first flow path switching mechanism predominantly allows the air, which has passed through the first adsorption block, to flow through the 1-1st flow path to be delayed, and wherein the control device monitors a concentration of the purification target substances contained in the air that has predominantly flowed from the flow path of the side on which the purification target substances are being desorbed, detected by a concentration sensor, from the switching from the first state to the second state and the switching from the second state to the first state and causes switching of a state in which the air is predominantly allowed to flow by one of the flow path switching mechanisms to be delayed until the monitored concentration is less than or equal to a preset threshold value of the concentration.

8. The vehicle air purification system according to claim 7, wherein, in coordination with delaying of switching of a state in which the air is predominantly allowed to flow by one of the flow path switching mechanisms, when the state is switched from the first state to the second state, the control device causes switching from a state in which the first flow path switching mechanism predominantly allows the air, which has passed through the first adsorption block, to flow through the 1-1st flow path to a state in which the first flow path switching mechanism predominantly allows the air, which has passed through the first adsorption block, to flow through the 1-2nd flow path to be delayed, and when the state is switched from the second state to the first state, the control device causes switching from a state in which the second flow path switching mechanism predominantly allows the air, which has passed through the second adsorption block, to flow through the 2-1st flow path to a state in which the second flow path switching mechanism predominantly allows the air, which has passed through the second adsorption block, to flow through the 2-2nd flow path to be delayed.

9. The vehicle air purification system according to claim 7, wherein, while switching of a state in which the air is predominantly allowed to flow by one of the flow path switching mechanisms is delayed, the control device increases an amount of air to be circulated toward the first flow path and the second flow path by the blower as compared with an amount of air before the switching of the state in which the air is predominantly allowed to flow by one of the flow path switching mechanisms is delayed and increases a proportion of the air which is distributed and delivered to a flow path of the side on which the purification target substances are adsorbed by the air distribution mechanism as compared with a proportion of the air before the switching of the state in which the air is predominantly allowed to flow by one of the flow path switching mechanisms is delayed.

10. The vehicle air purification system according to claim 7, wherein, while switching of a state in which the air is predominantly allowed to flow by one of the flow path switching mechanisms is delayed, the control device decreases an amount of air to be circulated toward the first flow path and the second flow path by the blower as compared with an amount of air before the switching of the state in which the air is predominantly allowed to flow by the one of the flow path switching mechanisms is delayed and decreases a proportion of the air which is distributed and delivered to a flow path of the side on which the purification target substances are adsorbed by the air distribution mechanism as compared with a proportion of the air before the switching of the state in which the air is predominantly allowed to flow by the one of the flow path switching mechanisms is delayed.

11. A method of controlling a vehicle air purification system, which includes a first flow path configured to communicate with a vehicle cabin, a second flow path configured to communicate with the vehicle cabin, a blower configured to circulate air from the vehicle cabin toward the first flow path and the second flow path, an air distribution mechanism configured to distribute and deliver air flowing from the vehicle cabin to one end of the first flow path and one end of the second flow path, a 1-1st flow path connected to the other end of the first flow path and configured to communicate with the vehicle cabin, a 1-2nd flow path connected to the other end of the first flow path and configured to communicate with the outside of the vehicle cabin, a first heating device which is a heating device disposed in the first flow path and configured to heat air inside the first flow path, a first adsorption block which is an adsorption block disposed in the first flow path and configured to adsorb at least carbon dioxide and water vapor contained in the air inside the first flow path as purification target substances and desorb the purification target substances when the air heated by the first heating device is passed, a first flow path switching mechanism which is a flow path switching mechanism disposed in the first flow path and configured to predominantly allow air, which has passed through the first adsorption block, to flow through either the 1-1st flow path or the 1-2nd flow path, a 2-1st flow path connected to the other end of the second flow path and configured to communicate with the vehicle cabin, a 2-2nd flow path connected to the other end of the second flow path and configured to communicate with the outside of the vehicle cabin, a second heating device which is a heating device disposed in the second flow path and configured to heat air inside the second flow path, a second adsorption block which is an adsorption block disposed in the second flow path and configured to adsorb the purification target substances contained in the air inside the second flow path and desorb the purification target substances when the air heated by the second heating device is passed, a second flow path switching mechanism which is a flow path switching mechanism disposed in the second flow path and configured to predominantly allow air, which has passed through the second adsorption block, to flow through either the 2-1st flow path or the 2-2nd flow path, and a control device configured to control components, the method comprising:

alternately implementing, by the control device, a first state in which the first flow path switching mechanism predominantly allows the air, which has passed through the first adsorption block, to flow through the 1-1st flow path without operating the first heating device and the second flow path switching mechanism predominantly allows the air, which has passed through the second adsorption block, to flow through the 2-2nd flow path by operating the second heating device and a second state in which the first flow path switching mechanism predominantly allows the air, which has passed through the first adsorption block, to flow through the 1-2nd flow path by operating the first heating device and the second flow path switching mechanism predominantly allows the air, which has passed through the second adsorption block, to flow through the 2-1st flow path without operating the second heating device;

when the state is switched between the first state and the second state, controlling, by the control device, the components at a timing that can inhibit the flow of the air from a flow path on which the purification target substances are being desorbed among the first flow path and the second flow path to the vehicle cabin;

when the state is switched from the first state to the second state, causing the second heating device in operation to be stopped before the state is switched from a state in which the second flow path switching mechanism predominantly allows the air, which has passed through the second adsorption block, to flow through the 2-2nd flow path to a state in which the second flow path switching mechanism predominantly allows the air, which has passed through the second adsorption block, to flow through the 2-1st flow path;

when the state is switched from the second state to the first state, causing the first heating device in operation to be stopped before the state is switched from a state in which the first flow path switching mechanism predominantly allows the air, which has passed through the first adsorption block, to flow through the 1-2nd flow path to a state in which the first flow path switching mechanism predominantly allows the air, which has passed through the first adsorption block, to flow through the 1-1st flow path; and performing time measurement with a timer from previous flow path switching by the first flow path switching mechanism and previous flow path switching by the second flow path switching mechanism and causes one of the heating devices to be stopped at a predetermined time.

12. A method of controlling a vehicle air purification system, which includes a first flow path configured to communicate with a vehicle cabin, a second flow path configured to communicate with the vehicle cabin, a blower configured to circulate air from the vehicle cabin toward the first flow path and the second flow path, an air distribution mechanism configured to distribute and deliver air flowing from the vehicle cabin to one end of the first flow path and one end of the second flow path, a 1-1st flow path connected to the other end of the first flow path and configured to communicate with the vehicle cabin, a 1-2nd flow path connected to the other end of the first flow path and configured to communicate with the outside of the vehicle cabin, a first heating device which is a heating device disposed in the first flow path and configured to heat air inside the first flow path, a first adsorption block which is an adsorption block disposed in the first flow path and configured to adsorb at least carbon dioxide and water vapor contained in the air inside the first flow path as purification target substances and desorb the purification target substances when the air heated by the first heating device is passed, a first flow path switching mechanism which is a flow path switching mechanism disposed in the first flow path and configured to predominantly allow air, which has passed through the first adsorption block, to flow through either the 1-1st flow path or the 1-2nd flow path, a 2-1st flow path connected to the other end of the second flow path and configured to communicate with the vehicle cabin, a 2-2nd flow path connected to the other end of the second flow path and configured to communicate with the outside of the vehicle cabin, a second heating device which is a heating device disposed in the second flow path and configured to heat air inside the second flow path, a second adsorption block which is an adsorption block disposed in the second flow path and configured to adsorb the purification target substances contained in the air inside the second flow path and desorb the purification target substances when the air heated by the second heating device is passed, a second flow path switching mechanism which is a flow path switching mechanism disposed in the second flow path and configured to predominantly allow air, which has passed through the second adsorption block, to flow through either the 2-1st flow path or the 2-2nd flow path, and a control device configured to control components, the method comprising:

alternately implementing, by the control device, a first state in which the first flow path switching mechanism predominantly allows the air, which has passed through the first adsorption block, to flow through the 1-1st flow path without operating the first heating device and the second flow path switching mechanism predominantly allows the air, which has passed through the second adsorption block, to flow through the 2-2nd flow path by operating the second heating device and a second state in which the first flow path switching mechanism predominantly allows the air, which has passed through the first adsorption block, to flow through the 1-2nd flow path by operating the first heating device and the second flow path switching mechanism predominantly allows the air, which has passed through the second adsorption block, to flow through the 2-1st flow path without operating the second heating device;

when the state is switched between the first state and the second state, controlling, by the control device, the components at a timing that can inhibit the flow of the air from a flow path on which the purification target substances are being desorbed among the first flow path and the second flow path to the vehicle cabin;

when the state is switched from the first state to the second state, causing switching from a state in which the second flow path switching mechanism predominantly allows the air, which has passed through the second adsorption block, to flow through the 2-2nd flow path to a state in which the second flow path switching mechanism predominantly allows the air, which has passed through the second adsorption block, to flow through the 2-1st flow path to be delayed;

when the state is switched from the second state to the first state, causing switching from a state in which the first flow path switching mechanism predominantly allows the air, which has passed through the first adsorption block, to flow through the 1-2nd flow path to a state in which the first flow path switching mechanism predominantly allows the air, which has passed through the first adsorption block, to flow through the 1-1st flow path to be delayed; and performing time measurement with a timer from switching from the first state to the second state and switching from the second state to the first state and causes switching of a state in which the air is predominantly allowed to flow by one of the flow path switching mechanisms to be delayed until a predetermined time is reached.

13. A method of controlling a vehicle air purification system, which includes a first flow path configured to communicate with a vehicle cabin, a second flow path configured to communicate with the vehicle cabin, a blower configured to circulate air from the vehicle cabin toward the first flow path and the second flow path, an air distribution mechanism configured to distribute and deliver air flowing from the vehicle cabin to one end of the first flow path and one end of the second flow path, a 1-1st flow path connected to the other end of the first flow path and configured to communicate with the vehicle cabin, a 1-2nd flow path connected to the other end of the first flow path and configured to communicate with the outside of the vehicle cabin, a first heating device which is a heating device disposed in the first flow path and configured to heat air inside the first flow path, a first adsorption block which is an adsorption block disposed in the first flow path and configured to adsorb at least carbon dioxide and water vapor contained in the air inside the first flow path as purification target substances and desorb the purification target substances when the air heated by the first heating device is passed, a first flow path switching mechanism which is a flow path switching mechanism disposed in the first flow path and configured to predominantly allow air, which has passed through the first adsorption block, to flow through either the 1-1st flow path or the 1-2nd flow path, a 2-1st flow path connected to the other end of the second flow path and configured to communicate with the vehicle cabin, a 2-2nd flow path connected to the other end of the second flow path and configured to communicate with the outside of the vehicle cabin, a second heating device which is a heating device disposed in the second flow path and configured to heat air inside the second flow path, a second adsorption block which is an adsorption block disposed in the second flow path and configured to adsorb the purification target substances contained in the air inside the second flow path and desorb the purification target substances when the air heated by the second heating device is passed, a second flow path switching mechanism which is a flow path switching mechanism disposed in the second flow path and configured to predominantly allow air, which has passed through the second adsorption block, to flow through either the 2-1st flow path or the 2-2nd flow path, and a control device configured to control components, the method comprising:

alternately implementing, by the control device, a first state in which the first flow path switching mechanism predominantly allows the air, which has passed through the first adsorption block, to flow through the 1-1st flow path without operating the first heating device and the second flow path switching mechanism predominantly allows the air, which has passed through the second adsorption block, to flow through the 2-2nd flow path by operating the second heating device and a second state in which the first flow path switching mechanism predominantly allows the air, which has passed through the first adsorption block, to flow through the 1-2nd flow path by operating the first heating device and the second flow path switching mechanism predominantly allows the air, which has passed through the second adsorption block, to flow through the 2-1st flow path without operating the second heating device;

when the state is switched between the first state and the second state, controlling, by the control device, the components at a timing that can inhibit the flow of the air from a flow path on which the purification target substances are being desorbed among the first flow path and the second flow path to the vehicle cabin;

when the state is switched from the first state to the second state, causing switching from a state in which the second flow path switching mechanism predominantly allows the air, which has passed through the second adsorption block, to flow through the 2-2nd flow path to a state in which the second flow path switching mechanism predominantly allows the air, which has passed through the second adsorption block, to flow through the 2-1st flow path to be delayed;

when the state is switched from the second state to the first state, causing switching from a state in which the first flow path switching mechanism predominantly allows the air, which has passed through the first adsorption block, to flow through the 1-2nd flow path to a state in which the first flow path switching mechanism predominantly allows the air, which has passed through the first adsorption block, to flow through the 1-1st flow path to be delayed; and monitoring a concentration of the purification target substances contained in the air that has predominantly flowed from the flow path of the side on which the purification target substances are being desorbed, detected by a concentration sensor, from the switching from the first state to the second state and the switching from the second state to the first state and causes switching of a state in which the air is predominantly allowed to flow by one of the flow path switching mechanisms to be delayed until the monitored concentration is less than or equal to a preset threshold value of the concentration.

\* \* \* \* \*